US011627283B2

(12) United States Patent
Astarabadi et al.

(10) Patent No.: US 11,627,283 B2
(45) Date of Patent: *Apr. 11, 2023

(54) METHOD FOR ENABLING SYNTHETIC AUTOPILOT VIDEO FUNCTIONS AND FOR PUBLISHING A SYNTHETIC VIDEO FEED AS A VIRTUAL CAMERA DURING A VIDEO CALL

(71) Applicant: Present Communications, Inc., Redwood City, CA (US)

(72) Inventors: Yousif Astarabadi, Redwood City, CA (US); Matt Mireles, Redwood City, CA (US); Shaun Astarabadi, Redwood City, CA (US); Emil Romanus, Redwood City, CA (US); Kristina Nikkhah, Redwood City, CA (US); Louis Lanctot, Redwood City, CA (US)

(73) Assignee: Present Communications, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,618

(22) Filed: Feb. 25, 2022

(65) Prior Publication Data
US 2022/0191429 A1 Jun. 16, 2022

Related U.S. Application Data

(63) Continuation-in-part of application No. 17/533,534, filed on Nov. 23, 2021, and a continuation-in-part of (Continued)

(51) Int. Cl.
H04N 7/15 (2006.01)
G06T 11/20 (2006.01)

(52) U.S. Cl.
CPC ............... *H04N 7/15* (2013.01); *G06T 11/20* (2013.01)

(58) Field of Classification Search
None
See application file for complete search history.

(56) References Cited

U.S. PATENT DOCUMENTS 8,456,507 B1 * 6/2013 Mallappa ............... H04N 7/152
379/202.01
9,888,211 B1 * 2/2018 Browne ................. G06V 20/48
(Continued)

*Primary Examiner* — Stella L. Woo
(74) *Attorney, Agent, or Firm* — Run8 Patent Group, LLC; Peter Miller

(57) ABSTRACT

One variation of a method for enabling autopilot functionality during a video call includes, during an operating period: receiving a sequence of frames from a camera in a first device; detecting a face, of a first user, in the sequence of frames; generating a sequence of facial landmark containers representing facial actions of the face of the first user; transmitting the sequence of facial landmark containers to a second device for combination with a look model to generate a first synthetic image feed depicting facial actions of the first user; and detecting a trigger event. The method also includes, during an autopilot operating period, entering autopilot mode; retrieving a prerecorded autopilot sequence of facial landmark containers from a memory; and transmitting the prerecorded autopilot sequence of facial landmark containers to the second device for combination with the look model to generate a second synthetic image feed depicting predefined facial actions.

17 Claims, 9 Drawing Sheets

Related U.S. Application Data application No. 17/353,575, filed on Jun. 21, 2021, now Pat. No. 11,356,640, application No. 17/533,534, which is a continuation of application No. 17/192,828, filed on Mar. 4, 2021, now Pat. No. 11,218,668, which is a continuation-in-part of application No. 16/870,010, filed on May 8, 2020, now Pat. No. 10,958,874.

(60) Provisional application No. 63/154,624, filed on Feb. 26, 2021, provisional application No. 63/153,924, filed on Feb. 25, 2021, provisional application No. 63/041,797, filed on Jun. 19, 2020, provisional application No. 62/845,781, filed on May 9, 2019.

(56) References Cited

U.S. PATENT DOCUMENTS

| Patent/Publication No. | Date | Inventor | Classification |
|---|---|---|---|
| 10,958,874 B2 * | 3/2021 | Astarabadi | G06V 40/166 |
| 11,218,668 B2 * | 1/2022 | Mireles | G06V 40/168 |
| 2013/0222419 A1 * | 8/2013 | Rosenberg | H04L 65/1096 345/629 |
| 2017/0310928 A1 * | 10/2017 | Nakano | H04L 65/1059 |
| 2019/0222807 A1 * | 7/2019 | Rivard | G06T 19/00 |
| 2020/0090393 A1 * | 3/2020 | Shin | G06V 40/174 |
| 2020/0204599 A1 * | 6/2020 | Ravichandran | H04L 65/1096 |
| 2021/0104086 A1 * | 4/2021 | Wang | G06V 20/40 |
| 2021/0400142 A1 * | 12/2021 | Jorasch | H04N 7/147 |

\* cited by examiner

METHOD FOR ENABLING SYNTHETIC AUTOPILOT VIDEO FUNCTIONS AND FOR PUBLISHING A SYNTHETIC VIDEO FEED AS A VIRTUAL CAMERA DURING A VIDEO CALL

CROSS-REFERENCE TO RELATED APPLICATIONS

This application is: a continuation-in-part of U.S. patent application Ser. No. 17/533,534, filed on 23 Nov. 2021, which is a continuation of U.S. patent application Ser. No. 17/192,828, filed on 4 Mar. 2021, which is a continuation-in-part of U.S. patent application Ser. No. 16/870,010, filed on 8 May 2020, which claims the benefit of U.S. Provisional Application No. 62/845,781, filed on 9 May 2019, each of which is incorporated in its entirety by this reference. This application is also a continuation-in-part of U.S. patent application Ser. No. 17/353,575, filed on 21 Jun. 2021, which claims the benefit of U.S. Provisional Application No. 63/041,779, filed on 19 Jun. 2020, each of which is incorporated in its entirety by this reference.

This application claims the benefit of U.S. Provisional Application No. 63/154,624, filed on 26 Feb. 2021, and U.S. Provisional Application No. 63/153,924, filed on 25 Feb. 2021, each of which is incorporated in its entirety by this reference.

TECHNICAL FIELD

This invention relates generally to the field of video conferencing and more specifically to a new and useful method for enabling synthetic autopilot video functions and for publishing a synthetic video feed as a virtual camera during a video call in the field of video conferencing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
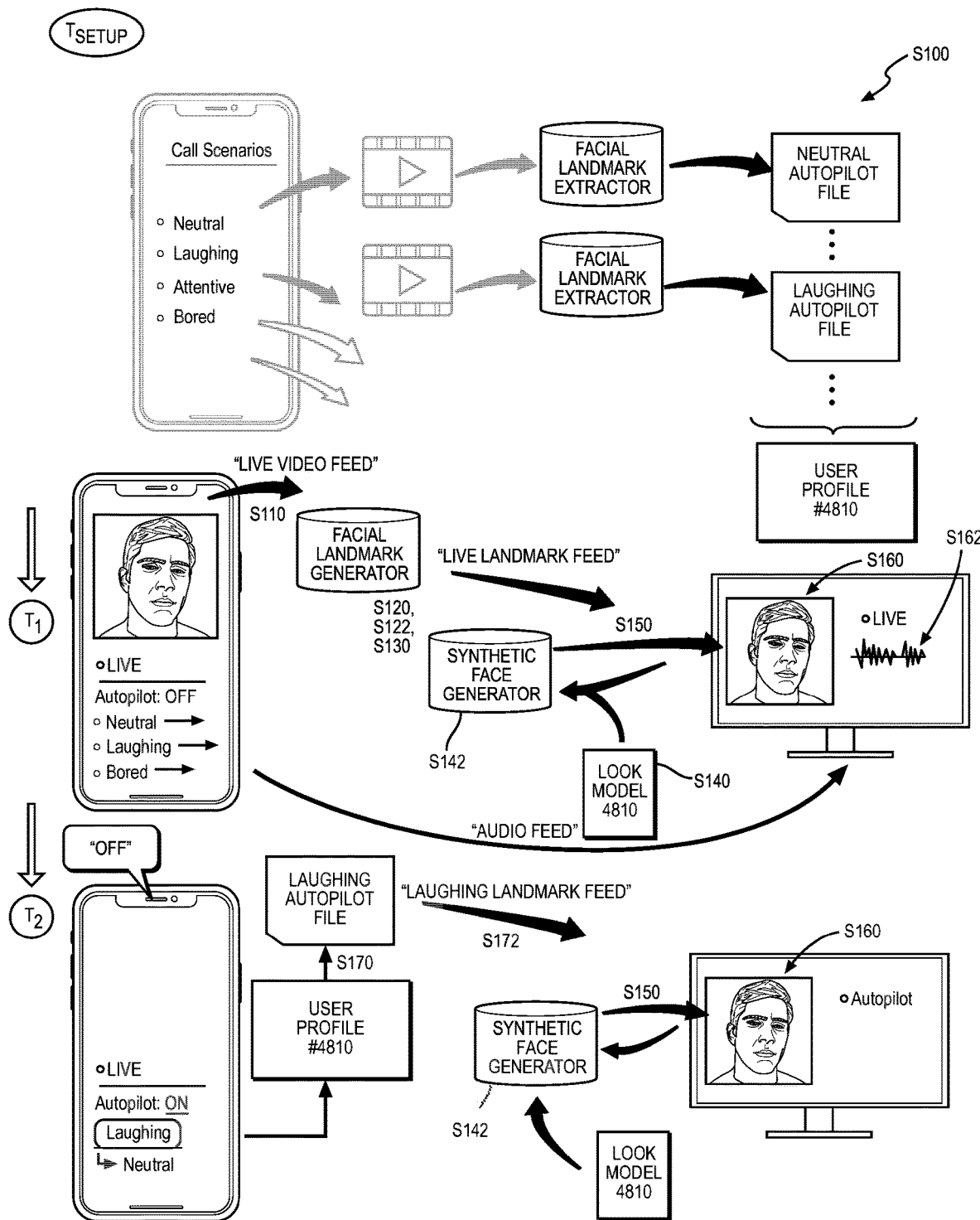
FIG. 1 is a flowchart representation of a method.

As shown in FIG. 1, a method S100 for enabling synthetic autopilot video functions during a video conference includes, at a first device associated with a first user: capturing a first live video feed in Block S110; for a first frame, in the first live video feed, captured at a first time, detecting a first constellation of facial landmarks in the first frame in Block S120 and representing the first constellation of facial landmarks in a first facial landmark container in Block S122; and transmitting the first facial landmark container and a first audio packet, captured at approximately (e.g., within 50 milliseconds of) the first time, to a second device in Block S130. The method S100 also includes, at the second device associated with a second user: accessing a first face model representing facial characteristics of the first user in Block S140; accessing a synthetic face generator in Block S142; transforming the first facial landmark container and the first face model into a first synthetic face image according to the synthetic face generator in Block S150; rendering the first synthetic face image at a second time in Block S160; and outputting the first audio packet at approximately (e.g., within 50 milliseconds of) the second time in Block S162.

The method S100 further includes, at the first device, in response to detecting absence of the first user's face in the first video frame: retrieving an autopilot file containing a prerecorded sequence of non-speech facial landmark containers representing the first user in a predefined video call scenario in Block S170; and transmitting the prerecorded sequence of non-speech facial landmark containers to the second device in place of facial landmark containers extracted from the first live video feed in Block S172.

The method S100 also includes, at the second device: transforming the prerecorded sequence of non-speech facial landmark containers, received from the first device, and the first face model into a sequence of synthetic face images according to the synthetic face generator in Block S150; and rendering the sequence of synthetic face images in Block S160.

Figure 6:
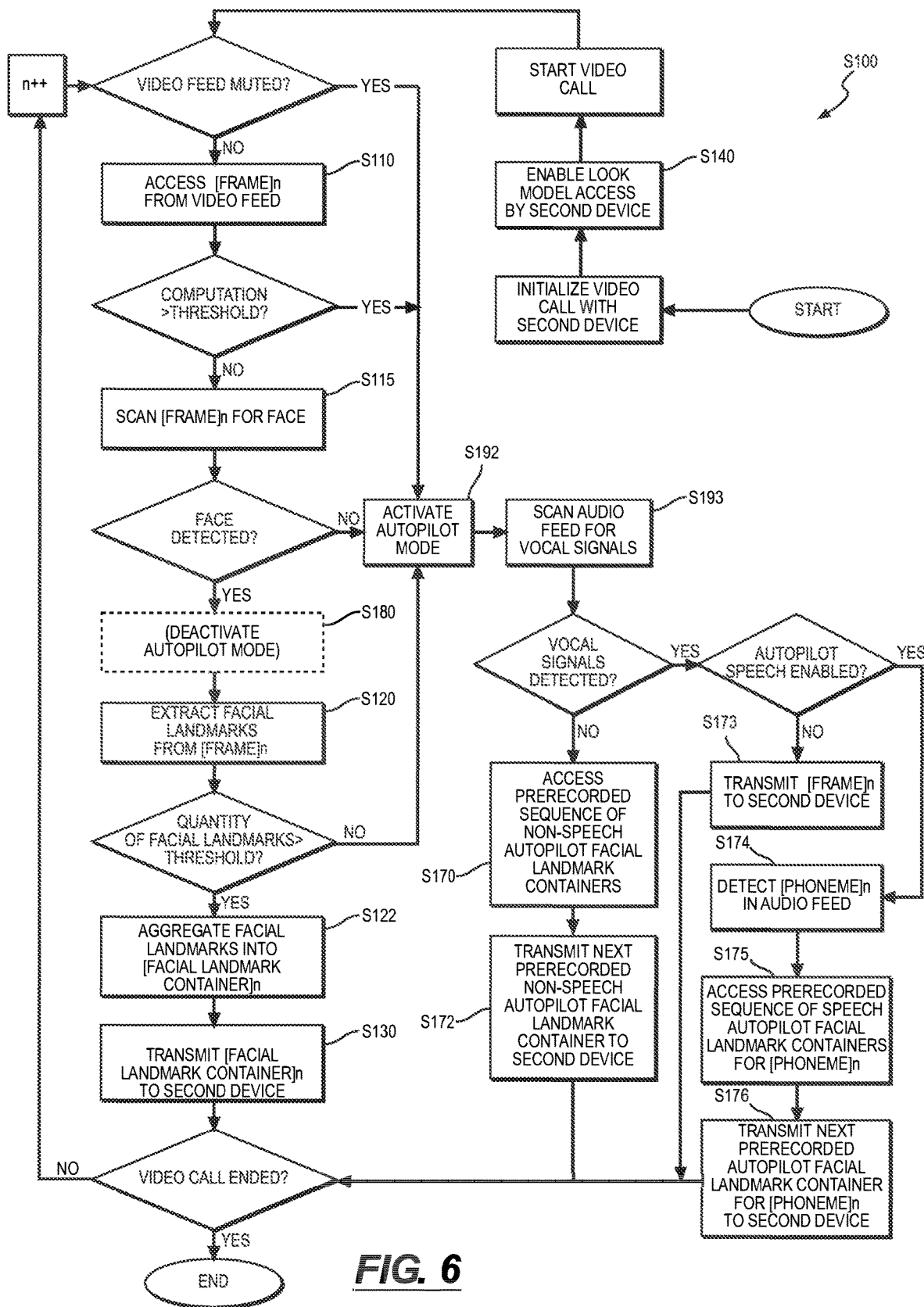
FIG. 6 is a flowchart representation of one variation of the method.

As shown in FIG. 6, one variation of the method S100 includes, at the first device: receiving a sequence of frames captured by an optical sensor in the first device; detecting a face, of the first user, in the sequence of frames in Block S115; generating a sequence of facial landmark containers representing facial actions of the face of the first user detected in the first sequence of frames in Block S122; and transmitting the sequence of facial landmark containers to the second device in Block S130. The method S100 also includes, at the second device: transforming the sequence of facial landmark containers and the first look model, associated with the first user, into a first synthetic image feed depicting facial actions of the first user during the video call, represented in the sequence of facial landmark containers, according to the first look model. This variation of the method also includes detecting a trigger event in Block S19o. This variation of the method further includes, at the first device, in response to detecting the trigger event: entering an autopilot mode in Block S192 retrieving the prerecorded autopilot sequence of facial landmark containers from a memory in Block S170; and transmitting the prerecorded autopilot sequence of facial landmarks to the second device for combination with the first look model in Block S172. This variation of the method also includes, at the second device: generating a second synthetic image feed depicting predefined facial actions, represented in the prerecorded autopilot sequence of facial landmark containers, according to the first look model.

As shown in FIG. 6, another variation of the method includes, during a video call, at the first device: receiving a first sequence of frames captured by the optical sensor in the first device; detecting the face, of the first user, in the first sequence of frames in Block S115; generating the first sequence of facial landmark containers representing facial actions of the face of the first user detected in the first sequence of frames in Block S122; and transmitting the first sequence of facial landmark containers to a second device for combination with a first look model in Block S130, associated with the first user, to generate a first synthetic image feed depicting facial actions of the first user during the first time period, represented in the first sequence of facial landmark containers, according to the first look model. This variation of the method further includes detecting a trigger event. Later in the video call, at the first device, in response to detecting the trigger event: entering an autopilot mode in Block S192; constructing an autopilot sequence of facial landmark containers based on content excluded from frames captured by the optical sensor during the second time period; and transmitting the prerecorded autopilot sequence of facial landmarks to the second device for combination with the first look model to generate a second synthetic image feed depicting predefined facial actions, represented in the prerecorded autopilot sequence of facial landmark containers, according to the first look model in Block S172.

As shown in FIG. 6, yet another variation of the method S100 includes, during a video call at the first device: receiving a first sequence of frames captured by an optical sensor in a first device; detecting a face, of a first user, in the first sequence of frames in Block S115; generating a first sequence of facial landmark containers representing facial actions of the face of the first user detected in the first sequence of frames in Block S122; and transmitting the first sequence of facial landmark containers to a set of devices, including a second device, for combination with local copies of the first look model to generate synthetic image feeds depicting facial actions of the first user during the first time period in Block S130. The method also includes, at the first device, detecting a trigger event. Later in the video call, at the first device, in response to detecting the trigger event: entering an autopilot mode in Block S192; retrieving a prerecorded autopilot sequence of facial landmark containers from a memory in Block S170; and transmitting the prerecorded autopilot sequence of facial landmark containers to the set of devices, comprising the second device, for combination with local copies of the first look model to generate synthetic image feeds depicting facial actions of the first user during the second time period in Block S172.

2. Applications

Generally, Blocks of the method S100 can be executed by native or browser-based applications executing on a set of computing devices (e.g., smartphones, tablets, laptop computers) during a video call (or a virtual reality experience, etc.) between two users in order: to compress a first live video feed of a first user into a first lightweight (e.g., sub-kilobyte) feed of constellations of facial landmarks at a first device; and to reconstruct this first live video feed at a second device by injecting this feed of facial landmark constellations and a first (pseudo-) unique face model of the first user into a synthetic face generator, which outputs a first stream of synthetic, photorealistic images of the first user that the second device then renders in near real-time. Simultaneously, the second device can compress a second video feed of the second user into a second lightweight constellation of facial landmarks; and the first device can reconstruct this second video feed by injecting this feed of facial landmark constellations and a second (pseudo-) unique face model of the second user into a synthetic face generator, which outputs a second stream of synthetic, photorealistic images of the second user that the first device then renders in near real-time.

Furthermore, during the video call, the first device can automatically transition to streaming a prerecorded sequence of non-speech facial landmark containers—depicting the first user in a predefined video call scenario (e.g., laughing, attentively listening, listening with disinterest, listening with a neutral expression, flinching)—to the second device in response to the first user exiting the field of view of a camera at the first device or manually selecting an "autopilot" function at the first device. The second device can then handle these prerecorded facial landmark containers identically to facial landmark containers derived from a live video feed at the first device in order to create a seamless transition from generating synthetic face images depicting the live state of the first user to depicting synthetic face images of the user in a prior video call scenario. The second user at the second device may therefore not perceive a change in the first user's synthetic video feed, thereby minimizing disruption in the video call as the first user steps away from the first device to answer a delivery, quiet a barking dog, engage a partner or child in the same room, or use a latrine.

Therefore, the first device can implement Blocks of the method S100 to selectively transition between: transmitting facial landmark containers derived from a live video feed to the second device when the first user is actively engaged in a video call; and transmitting prerecorded facial landmark containers—depicting the first user in a predefined video call scenario—to the second device when the first user's attention shifts away from the video call, when the first user mutes her video feed, when the first user manually selects activates the autopilot mode, or when the first user steps away from the first device during the video call. The second device can then implement Blocks of the method S100 to generate a continuous synthetic video feed from streams of "live" facial landmark containers and prerecorded facial landmark containers received from the device and to render this continuous synthetic video feed for the second user during the video call.

More specifically, the first and second devices can cooperate to enable the first user to step away from the video call (e.g., for a restroom break during a work-related video call) while a) still appearing to be present and engaged in the video call or b) not otherwise interrupting the video call. The first and second devices can similarly cooperate to enable the first user to focus her attention elsewhere while still appearing to be present and engaged in the video call, such as to accept a home delivery, to take another phone call, to read and respond to an inbound text message, or to quiet a barking dog.

2.1 Bandwidth

In particular, rather than transmit and receive data-rich video feeds during a video call, a first device executing Blocks of the method S100 can instead extract facial landmark constellations from a first live video feed captured at the first device, package these facial landmark constellations into facial landmark containers, and transmit a first feed of facial landmark containers to the second device. The second device can then: leverage a local copy of the synthetic face generator and a local copy of a first look model associated with the first user to transform the first feed of facial landmark containers into a photorealistic representation of the first user's face; and render this first photorealistic synthetic video feed in near real-time. Concurrently, the second device—also executing Blocks of the method S100—can extract facial landmark containers from a second video feed captured at the second device and transmit a second feed of facial landmark containers to the second device. The first device can then: leverage a local copy of the synthetic face generator and a local copy of a second look model associated with the second user to transform the second feed of facial landmark containers into a photorealistic representation of the second user's face; and render this second photorealistic synthetic video feed in near real-time. The second user may thus experience the video call as though a color video was received from the first user's device—and vice versa—without necessitating a consistent, high-bandwidth, low-latency data connection between the first and second devices.

More specifically, by extracting facial landmark containers from a high(er)-definition video feed according to the method S100, the first device can compress this high(er)-definition video feed by multiple orders of magnitude (e.g., by approximately 100 times). Transmission of a feed of facial landmark containers—at a natural frame rate of the original high(er)-definition video (e.g., 24 frames per second)—from the first device to the second device during a video call may therefore require significantly less bandwidth than the original high-definition video (e.g., less than 10 kilobits per second rather than 1.5 Megabits per second). The second device can: then reconstruct the first live video feed of the first user by passing a local copy of a (pseudo)-unique look model of the first user and a first feed of facial landmark containers—received from the first device—into a synthetic face generator, which rapidly outputs a stream of synthetic, photorealistic images of the first user's face (e.g., in under 100 milliseconds or within as little as 30 milliseconds of a receipt of each subsequent facial landmark container from the first device); and render this stream of synthetic, photorealistic images of the first user's face. Therefore, the first and second devices can execute Blocks of the method S100 to support consistent, high-quality video—with significantly less upload and download bandwidth—during a video call.

2.2 Latency

Furthermore, humans may perceive audible and visual events temporally offset by up to 200 milliseconds as occurring concurrently. However, the first and second devices can cooperate to rapidly execute Blocks of the method S100. For example, the first device can: capture a video frame; generate first facial landmark container representing a first facial landmark constellation detected in this video frame; and upload this first facial landmark container to a computer network within 50 milliseconds. The second device can then: download this facial landmark container; inject this facial landmark container and a stored local copy of a first look model of the first user into a local copy of the synthetic face generator to generate a synthetic face image; overlay the synthetic face image on a static or animated background frame to generate a synthetic video frame; and render the synthetic video frame on a display of the second device within 150 milliseconds of receipt of the facial landmark container.

Generally, because the first device compresses a video feed (e.g., by orders of magnitude) into a stream of facial landmark containers (e.g., in the form of a vector containing 68 (x,y) coordinates for 68 predefined facial landmarks), packet size for facial landmark containers transmitted from the first device to the second device may be relatively very small. Therefore, throughput requirements to transmit this stream of facial landmark containers between the first and second devices over wireless and local area networks may be significantly less than actual throughputs supported by these networks. More specifically, transmission of this lightweight stream of facial landmark containers from the first device to the second device may represent a relatively small portion of the total duration of time from capture of a video frame at the first device to reconstruction and rendering of a corresponding synthetic video frame at the second device. Accordingly, this stream of facial landmark containers may not (or may very rarely) approach throughput limitations of these networks, thereby enabling these networks to transmit this lightweight stream of facial landmark containers from the first device to the second device with low latency, low packet loss, and high consistency despite changes in traffic between other devices connected to these networks and even during periods of high traffic on these networks.

2.3 Realism

Figure 5:
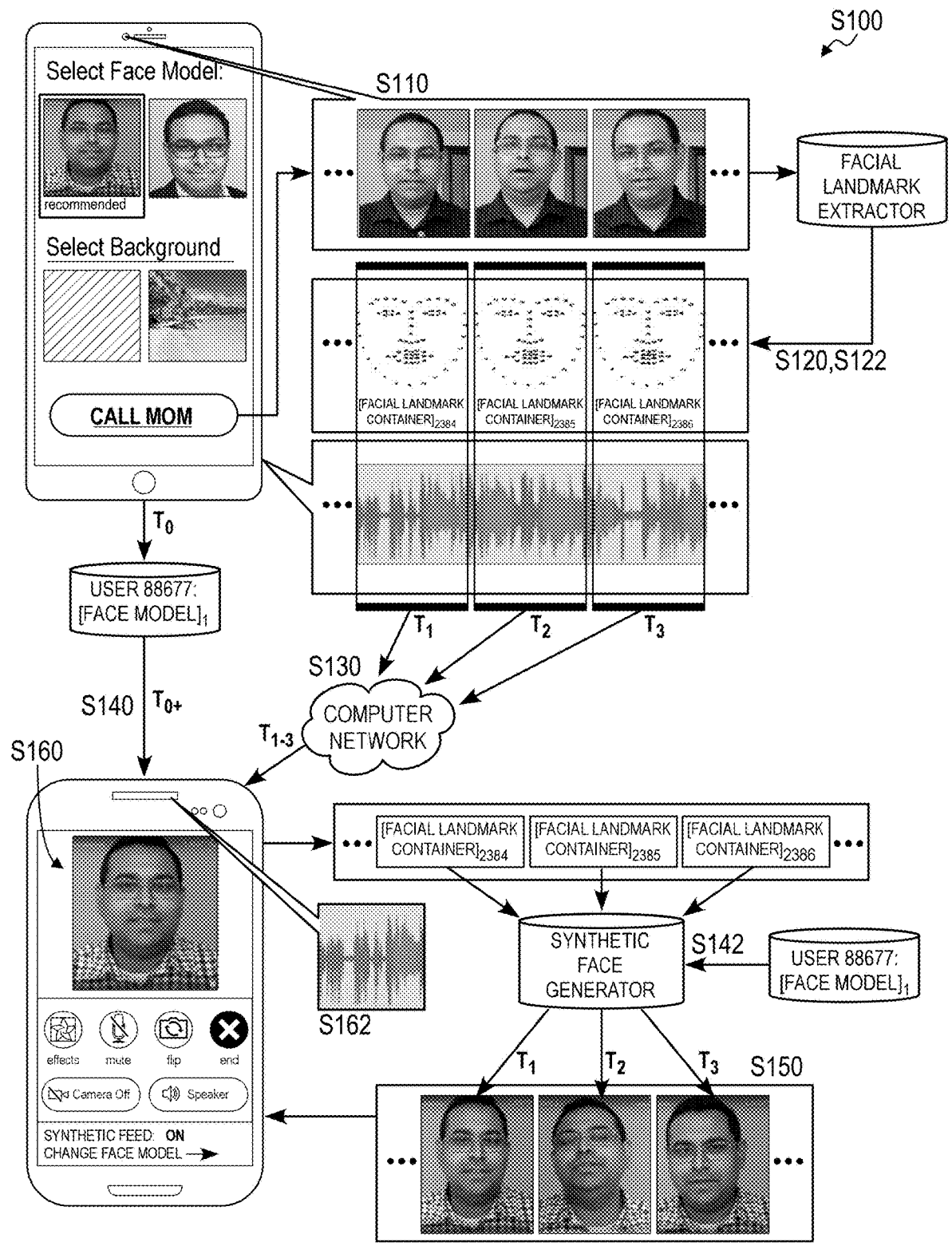
FIG. 5 is a flowchart representation of one variation of the method.

By executing Blocks of the method S100, as shown in FIG. 5, the first and second devices can render authentic, photorealistic representations of the second and first users, respectively, during a video call—such as relative to cartoons, avatars, or caricatures that may loose authenticity and integrity due to compression and simplification of user facial expressions.

For example, the first device and/or a remote computer system (e.g., a remote server, a computer network) can: access an image (e.g., a digital photographic image, a frame from a video clip) of the first user; detect the first user's face in this image; implement a standard or generic facial landmark extractor to detect and extract a facial landmark constellation; from this image; represent this facial landmark constellation in a facial landmark container; initialize a first look model containing an initial set of coefficients (or "weights"); pass this facial landmark container and the initial look model into a synthetic face generator to generate an initial synthetic face image; characterize a difference between this initial synthetic face image and the first user's face depicted in the image; and iteratively adjust coefficients in the first look model such that insertion of this first look model and the facial landmark container into the synthetic face generator produces synthetic face images with smaller differences from the first user's face depicted in the image. Once a difference between a synthetic face image thus produced according to the first look model and the first user's face depicted in the image falls below a threshold difference, the first device or the remote computer system can store this first look model in association with the first user, such as in an account or profile associated with the user.

In this example, the first device and/or the remote computer system can implement this process when the first user creates an account within a first instance of the native or browser-based video conferencing application executing on the first device, during a setup period just before starting a video call with the second device, or after starting a video call with the second device. Additionally, or alternatively, the first device (or the remote computer system) can repeat this process for additional images or video clips of the first user (e.g., depicting the first user with various facial expressions and from various perspectives) and fuse look models thus calculated for these additional images or video clips into a single, more robust look model of the user.

The first device (or the remote computer system) can then share this look model—specific to the first user—with a second device before or during a video call. During this video call, the first device can also capture a video frame via an integrated or connected camera, extract a facial landmark container from this video frame, and stream this facial landmark container to the second device. The second device can then implement this look model to transform this facial landmark container into a synthetic, photorealistic image of the first user's face, which exhibits a facial expression of the first user, a mouth shape of the first user, and a position of the first user relative to the camera at a time that the camera captured the video frame.

Therefore, though the first device streams a feed of facial landmark containers to the second device rather than a live video feed of photographic video frames, the second device can leverage the look model of the first user and the synthetic face image to generate a photorealistic feed of synthetic images that both: appear to the second user as the first user; and authentically reproduce the first user's facial expression, mouth shape, and a position relative to the first device.

2.4 Autopilot Authenticity

Furthermore, when "autopilot" is activated at the first device—such as manually by the first user or automatically when the first device no longer detects the first user in the first live video feed—the first device can stream a prerecorded sequence of non-speech facial landmark containers to the second device, which then fuses these facial landmark containers and the first user's look model to generate a synthetic video feed that depicts the first user in an animated scene according to the aesthetic characteristics of the first user defined in the first look model.

The first device therefore streams a prerecorded sequence of non-speech facial landmark containers to the second device—and not a prerecorded video clip or static image that produces a discontinuity in the video feed of the first user rendered at the second device—when "autopilot" is activated at the first device. More specifically, if the first device transitions from a) streaming a live video feed or a feed of facial landmark containers of the first user to a second device to b) transmitting a prerecorded video clip of the first user (e.g., recorded on a different date) to the second device during a video call, such as when the first user mutes her video feed, a second user at the second device will view the first user in different clothes, in front of a different background, in a different lighting conditions, with a different hair style, with different makeup, etc. This transition may be disruptive for the second user, break the second user's train of thought, and/or prompt the second user to ask the first user if she is still present in the video call.

Conversely, the first device can implement Blocks of the method S100 to transition from a) streaming a live video feed or a feed of facial landmark containers of the first user to the second device to b) streaming a prerecorded sequence of non-speech facial landmark containers of the first user during the video call, such as when the first user mutes her video feed or selects an autopilot mode at the first device. The second device can then process this stream of prerecorded facial landmark containers in the same pipelines as a live stream of facial landmark containers received from the first device in order to generate and render a synthetic video feed depicting the first user with a consistent "look," with consistent lighting, and over a consistent background, etc.

In particular, the second device can inject a live stream of facial landmark containers received from the first device and a first look model—previously selected by the first user before or during the video call—into a synthetic face generator to generate a feed of synthetic face images depicting the first user's current (or "live") physiognomy according to the first look model. The second device can then: overlay the feed of synthetic face images on a background previously selected by the first user to generate a synthetic video feed; and render this synthetic video feed for the second user. When the first device transitions to streaming prerecorded facial landmark containers to the second device, the second device can continue this process to: inject this prerecorded stream of facial landmark containers received from the first device and the first look model into the synthetic face generator to generate a feed of synthetic face images depicting the first user in a predefined video call scenario according to the first look model. The second device can then: overlay this feed of synthetic face images on the same background to generate a synthetic video feed; and render this synthetic video feed for the second user.

Accordingly, the first and second device can cooperate to produce a seamless transition: from a) generating and rendering a synthetic video feed depicting the first user according to a first look model selected by the first user and a stream of facial landmark containers extracted from a live video feed of the first user; to b) generating and rendering a synthetic video feed depicting the first user according to this same look model and a prerecorded sequence of non-speech facial landmark containers extracted from a prerecorded video clip of the first user. For example, the first and second devices can execute this transition when the first user steps out of the field of view of a camera at the first device, mutes a video feed at the first device, or manually selects an autopilot mode at the first device. The first and second device can similarly cooperate to produce a seamless transition: from b) generating and rendering the synthetic video feed depicting the first user according to the first look model and the sequence of non-speech facial landmark containers; back to c) generating and rendering a synthetic video feed depicting the first user according to the first look model and facial landmark container extracted from a live video feed captured at the first device. For example, the first and second devices can execute this transition when the first user steps back into the field of view of the camera at the first device, reactivates a video feed at the first device, or manually deactivates the autopilot mode at the first device.

Therefore, the first and second device can cooperate to produce a seamless synthetic video feed depicting the first user over a continuous background, with a continuous "look" or physiognomy, and with authentic and animated facial and body movements as the first user transitions into and out of a first live video feed at the first device and/or as the user selectively mutes and activates the first live video feed.

2.5 Devices

The method S100 is described herein as executed by instances of a video conferencing application (hereinafter the "application"), such as a native video conferencing application or a browser-based application operable within a web browser executing on a device, such as a smartphone, tablet, or laptop computer.

Furthermore, Blocks of the method S100 are described herein as executed: by a first device to transform a first live video feed of a first user into facial landmark containers and to stream facial landmark containers to a second device; and by a second device to reconstruct and render a photorealistic, synthetic representation of the first live video feed for viewing by a second user. However, the second device can simultaneously transform a second live video feed of the second user into facial landmark containers and stream facial landmark containers to the first device; and the first device can simultaneously reconstruct and render a photorealistic, synthetic representation of the second video feed for viewing by the first user.

Furthermore, the method S100 is described herein as implemented by consumer devices to host a two-way video call between two users. However, the first method can be similarly implemented by a device to host one-way live video distribution, or asynchronous video replay. Additionally or alternatively, the method S100 can be executed by multiple devices to host a multi-way video call between multiple (e.g., three, ten) users.

3. Facial Landmark Extractor

Figure 3:
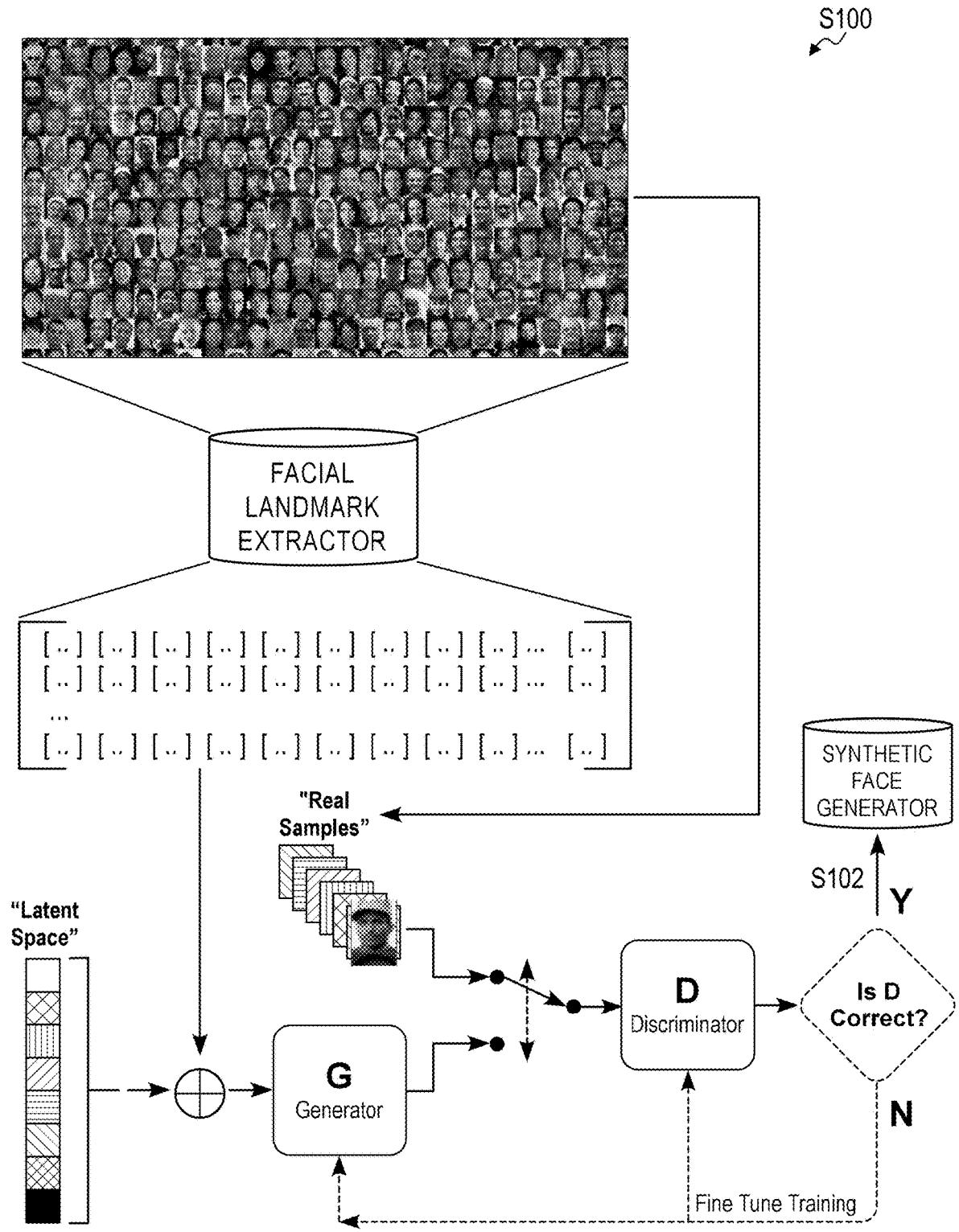
FIG. 3 is a flowchart representation of one variation of the method.
Figure 4:
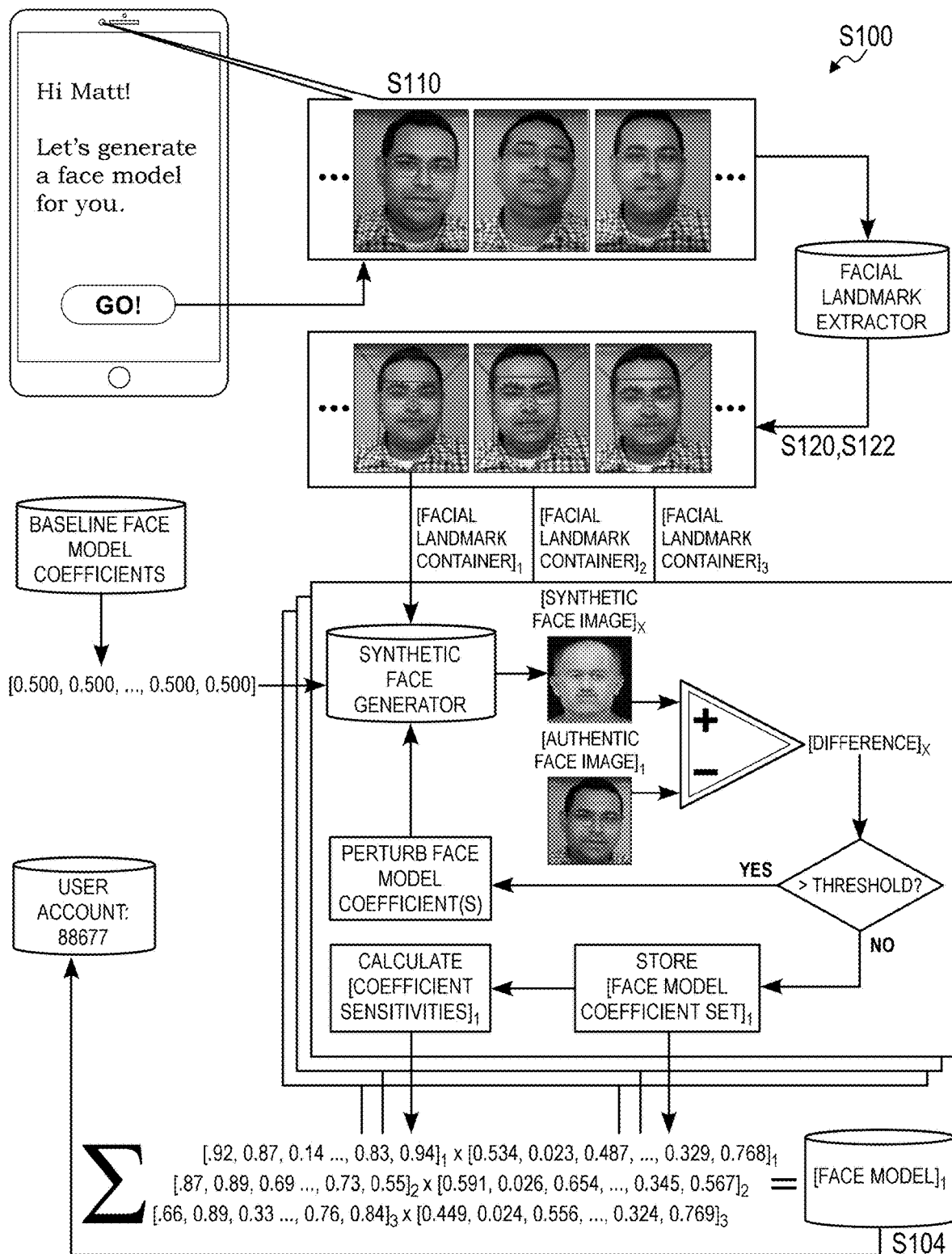
FIG. 4 is a flowchart representation of one variation of the method.

Generally, a device executing the application and/or the remote computer system can implement a facial landmark extractor: to detect a face in a region of an image (e.g., a photographic image, a frame in a video clip, and/or a frame in a live video feed); to scan this region of the image for features analogous to predefined facial landmark types; and to represent locations, orientations, and/or sizes, etc. of these analogous features—detected in the region of the image—in one facial landmark container. In particular, like the facial deconstruction model described above, the device and/or the remote computer system can implement the facial landmark extractor: to detect spatial characteristics of a face—such as including positions of eye corners, a nose tip, nostril corners, mouth corners, end points of eyebrow arcs, ear lobes, and/or a chin—depicted in a 2D image; and to represent these spatial characteristics in a single container (e.g., a vector, a matrix), as shown in FIGS. 3 and 4. For example, the device and/or the remote computer system can implement facial landmark detection to extract a facial landmark container: from a video frame during generation of a face model for a user (e.g., during initial setup of the user's account); from a photographic image during generation of a "look model" for the user; and/or from a video frame for transmission to a second device during a video call.

In one implementation shown in FIGS. 3 and 4, to generate a facial landmark container from an image (or frame), the device (or the remote computer system): accesses the image; implements facial detection techniques to detect a face in a region of the image; and initializes a facial landmark container in the form of a vector of length equal to a total quantity of predefined facial landmark types (e.g., 68). Then, for a first facial landmark type in this predefined set of facial landmark types, the device: scans the region of the frame for a feature analogous to the first facial landmark type; extracts a first location (and/or a first size, first orientation) of a particular feature depicted in the image in response to identifying this particular feature as analogous to (e.g., of a similar form, relative location, relative size) the first facial landmark type according to the facial landmark extractor; and then writes this first location (and/or first size, first orientation) of the particular feature to a first position in the vector corresponding to the first facial landmark type. Similarly, for a second facial landmark type in this predefined set of facial landmark types, the device: scans the region of the frame for a feature analogous to the second facial landmark type; and then writes a null value to a second position in the vector corresponding to the second facial landmark type in response to failing to identify a particular feature analogous to the second facial landmark time in the region of the image. The device then repeats this process for each other facial landmark type in the predefined set in order to complete the facial landmark container for this image.

Furthermore, in this example, the device (or the remote computer system) can generate a facial landmark container that represents a pixel position (e.g., an (x,y) coordinate) of each detected facial landmark type within the image—and not specifically the position of the facial landmark within the region of the image depicting the user's face—such that insertion of this facial landmark container and a face model of the user into a synthetic face generator: produces a synthetic face image that appears as a photographic analog of the user's face depicted in the image; and locates this synthetic face image in a position within a synthetic video frame that is analogous to the location of the user's face depicted in the image 4. Synthetic Face Generator Similarly, the device and/or the remote computer system can implement a synthetic face generator to transform a facial landmark container—representing a facial expression of a user detected in an image or frame—and a face model of the user into a synthetic face image, which defines a photorealistic representation of the user's face with this same facial expression. In particular, like the facial reconstruction model described above, the device and/or the remote computer system can inject a facial landmark container—derived from an original image or frame of a user—and a face model of the user into the synthetic face generator to generate a synthetic face image that may be perceived as (at least) a superficially authentic photorealistic representation of the user's face with the same facial expression depicted in the original image or frame. For example, the device and/or the remote computer system can implement the synthetic face generator to generate a synthetic face image: to generate and validate a new face model for a user (e.g., during initial setup of the user's account); to generate and validate a new look model for the user; and/or to generate synthetic face images of another user during a video call.

In one implementation shown in FIG. 2, the remote computer system: accesses a population of images of human faces (e.g., thousands, millions or 2D color images of human faces); implements the facial landmark extractor to extract a facial landmark container for each image in the population; and trains a conditional generative adversarial network to generate an image—given a facial landmark container and a face model containing a set of coefficients or "weights"—with statistics analogous to the population of images.

In particular, the remote computer system can train the conditional generative adversarial network to output a synthetic face image based on a set of input conditions, including: a facial landmark container, which captures relative locations (and/or sizes, orientations) of facial landmarks that represent a facial expression; and a face model, which contains a (pseudo-) unique set of coefficients characterizing a unique human face and secondary physiognomic features (e.g., face shape, skin tone, facial hair, makeup, freckles, wrinkles, eye color, hair color, hair style, and/or jewelry). Therefore, the remote computer system can input values from a facial landmark container and coefficients from a face model into the conditional generative adversarial network to generate a synthetic face image that depicts a face—(uniquely) represented by coefficients in the face model—exhibiting a facial expression represented by the facial landmark container.

The remote computer system can then store this conditional generative adversarial network as a synthetic face generator and distribute copies of this synthetic face generator to devices executing the application, as shown in FIG. 2.

5. Face Model Generation

Furthermore, the device can implement methods and techniques described in U.S. patent application Ser. Nos. 17/138,822, 17/353,575, and 17/192,828 to generate and store a face model and/or a look model of the user.

For example, during a setup period (e.g., prior to a video call), the device can: access a target image of a user; detect a target face in the target image; represent a target constellation of facial landmarks, detected in the target image, in a target facial landmark container; initialize a target set of look model coefficients; generate a synthetic test image based on the target facial landmark container, the target set of look model coefficients, and a synthetic face generator; characterize a difference between the synthetic test image and the target face detected in the target image; adjust the target set of look model coefficients to reduce the difference; and generate a look model, associated with the user, based on the target set of look model coefficients. Later, during a video call with the user, a second device can access (e.g., download and store a local copy of) this look model.

However, the device or other computer system can implement any other method or technique to generate a face or look model representing the user.

6. Prerecorded Autopilot Clips

In one variation shown in FIG. 1, the application executing Blocks of the method S100 is preloaded with a set of predefined video call scenarios, such as: laughing; expressing concern; bored; responding to a loud noise; attentive; contemplative; in agreement; in disagreement; and neutral engagement. Accordingly, the device executing the application can interface with the user to: capture video clips depicting the user in these predefined video call scenarios; extract sequences of facial landmark containers from these video clips; and store these non-speech sequences of facial landmark containers—linked to their corresponding predefined video call scenarios—in the user's profile.

6.1 "Laughing"

In one example, the application presents a list of the set of predefined call scenarios to the user. In response to the user selecting the "laughing" video call scenario from this list, the application can: initiate capture of a video clip, such as for a fixed duration of ten seconds; and present a joke, a cartoon, or a video clip of people laughing to the user while capturing this video clip in order to spontaneously prompt the user to laugh. The application can then replay this video clip for the user with a prompt to: label a frame concurrent with start of laughter in the video clip; label a frame concurrent with conclusion of laughter in the video clip; or to crop the video clip to exclusively include frames depicting the user smiling or laughing. The application can then extract and store this subset of frames from the video clip.

Alternatively, the application can: implement computer vision techniques to detect a smiling or laughing expression in a subset of frames in the video clip; and then automatically extract and store this subset of frames from the video clip.

Yet alternatively, the application can: prompt the user to upload an existing video clip depicting the user laughing; prompt the user to manually crop the video clip to a relevant section of the video clip or implement methods and techniques described above to automatically isolate this relevant section of the video clip; and then extract and store the corresponding subset of frames from the video clip. However, the application can implement any other method or technique to isolate a sequence of relevant frames depicting the user laughing or smiling in the video clip.

The application can then: implement the facial landmark container as described above to extract a sequence of non-speech facial landmark containers from this subset of frames; inject this sequence of non-speech facial landmark containers and a look model in the user's profile into the synthetic face generator to generate a sequence of synthetic frames; replay this sequence of synthetic frames for the user; (repeat this process for other look models stored in the user's profile;) and prompt the user to confirm this sequence of synthetic frames or to discard this sequence of synthetic frames and record a new video clip for "laughing."

Once the user confirms the sequence of synthetic frames generated from facial landmark containers extracted from a video clip of the user laughing, the application can write the sequence of non-speech facial landmark containers—that generated the confirmed sequence of synthetic frames depicting the user laughing—to a "laughing" autopilot file linked to the "laughing" video call scenario. The application can then store this "laughing" autopilot file in the user's profile.

Furthermore, the application can selectively write playback options to the "laughing" autopilot file, such as: when a "laughing" video call scenario is manually selected from a menu by the user during a video call; or automatically when laughter is detected in video feeds from other users on a video call while autopilot is active at the user's device.

6.2 "Loud Noise"

In another example, in response to the user selecting the "laughing" video call scenario from this list, the application can: initiate capture of a video clip, such as for a fixed duration of ten seconds; and output a sharp, loud noise to startle the user during capture of this video clip. The application can then implement methods and techniques described above: to extract a sequence of non-speech facial landmark containers from a relevant section of this video; to write this sequence of non-speech facial landmark containers to a "loud noise" autopilot file linked to the "loud noise" video call scenario; store this "loud noise" autopilot file in the user's profile; and enable playback options for the "loud noise" autopilot file, such as automatically when a loud noise is detected in an audio feed from another user on a video call while autopilot is active at the user's device.

6.8 "Agreement"

In yet another example, in response to the user selecting the "in agreement" video call scenario from this list, the application can: initiate capture of a video clip, such as for a fixed duration of ten seconds; and prompt the user to nod in the affirmative or look approvingly into the camera during capture of this video clip. The application can then implement methods and techniques described above: to extract a sequence of non-speech facial landmark containers from a relevant section of this video; to write this sequence of non-speech facial landmark containers to an "agreement" autopilot file linked to the "agreement" video call scenario; store this "agreement" autopilot file in the user's profile; and enable playback options for the "agreement" autopilot file, such as when manually selected from a menu by the user during a video call and/or automatically when facial cues indicative of agreement are detected in a plurality or majority of video feeds received from other users on a video call while autopilot is active at the user's device.

6.4 "Attentive"

In a similar example, in response to the user selecting the "attentive" video call scenario from this list, the application can: initiate capture of a video clip, such as for a fixed duration of ten seconds; and prompt the user to lean forward and focus intently on the camera during capture of this video clip. The application can then implement methods and techniques described above: to extract a sequence of non-speech facial landmark containers from a relevant section of this video; to write this sequence of non-speech facial landmark container to an "attentive" autopilot file linked to the "attentive" video call scenario; store this "attentive"

autopilot file in the user's profile; and enable playback options for the "attentive" autopilot file, such as when manually selected from a menu by the user, automatically (e.g., three times in a loop) after replaying the "laughing" autopilot file and before transitioning to the "neutral" autopilot file described below, and/or automatically upon detecting facial cues or head movements indicative of attentiveness in a plurality or majority of video feeds from other users on a video call while autopilot is active at the user's device.

6.5 "Bored"

In yet another example, in response to the user selecting the "bored" video call scenario from this list, the application can: initiate capture of a video clip, such as for a fixed duration of ten seconds; and prompt the user to look away from the camera and appear disinterested during capture of this video clip. The application can then implement methods and techniques described above: to extract a sequence of non-speech facial landmark containers from a relevant section of this video; to write this sequence of non-speech facial landmark containers to a "bored" autopilot file linked to the "bored" video call scenario; store this "bored" autopilot file in the user's profile; and enable playback options for the "bored" autopilot file, such as when manually selected from a menu by the user during a video call while autopilot is active at the user's device.

6.6 "Neutral"

In another example, in response to the user selecting the "neutral" video call scenario from this list, the application can: initiate capture of a video clip, such as for a fixed duration of ten seconds; and prompt user to look toward the camera with mild or neutral interest during capture of this video clip. The application can then implement methods and techniques described above: to extract a sequence of non-speech facial landmark containers from a relevant section of this video; to write this sequence of non-speech facial landmark container to a "neutral" autopilot file linked to the "neutral" video call scenario; store this "neutral" autopilot file in the user's profile; and enable playback options for the "neutral" autopilot file, such as by default when autopilot is activated at the user's device.

6.7 Other Predefined Video Call Scenarios

The application can interface with the user to generate a corpus of autopilot files for other video call scenarios and to store these autopilot files in the user's profile.

7. Video Call Configuration

Figure 2A:
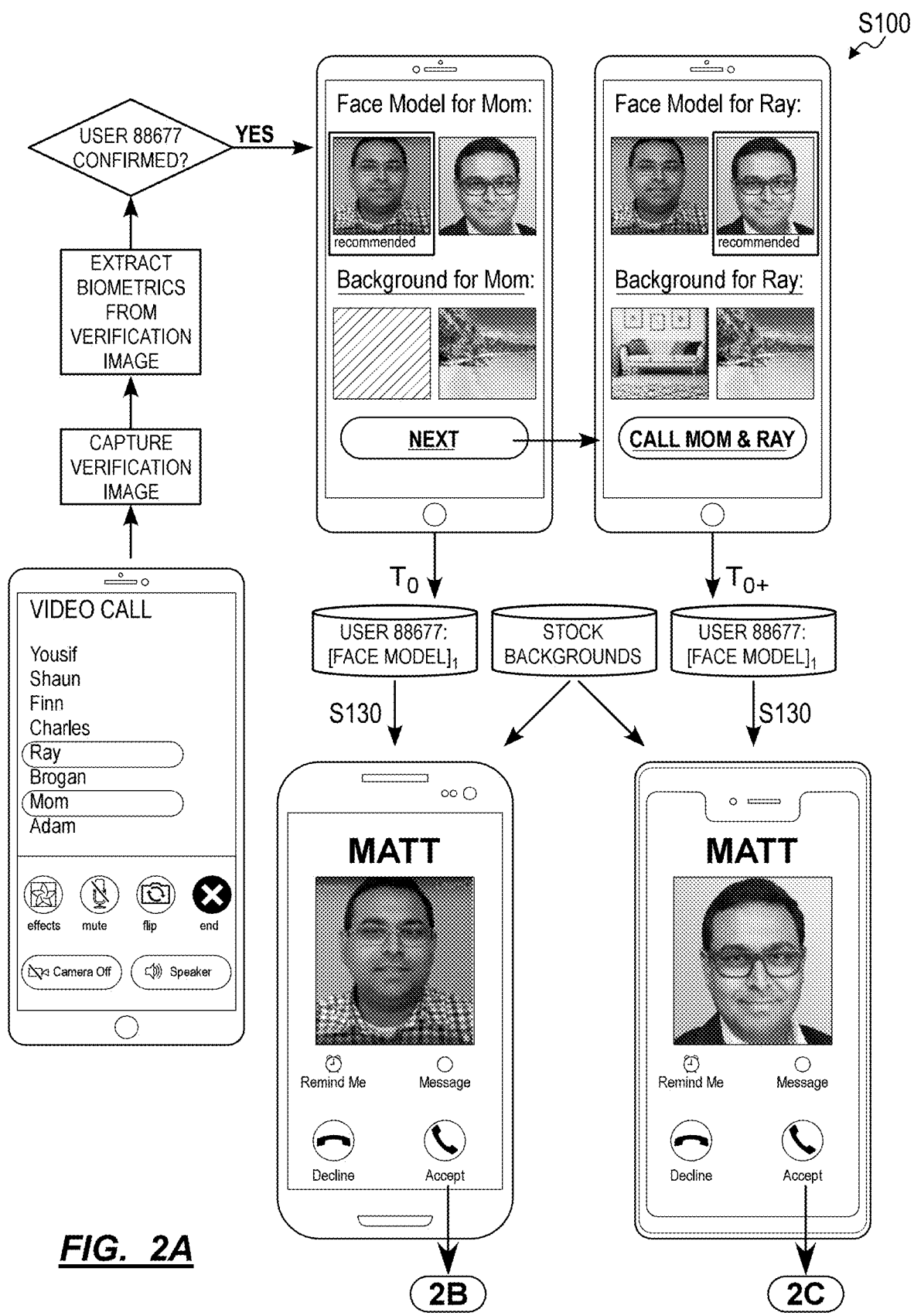
FIGS. 2A, 2B, 2C, and 2D are flowchart representations of one variation of the method.
Figure 2B:
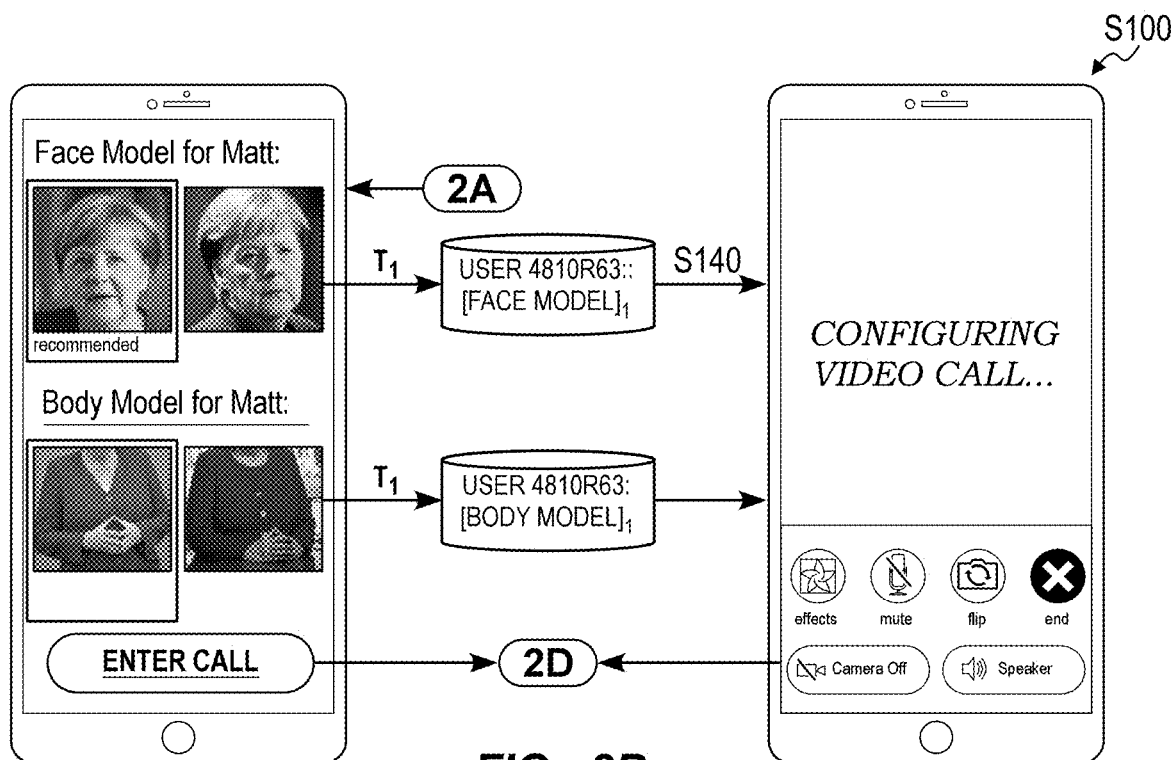

When a first user opens the native or browser-based video conferencing application executing on a first device, the first device can interface with the user to configure an upcoming video call with a second user, including selection of a look model for representing the first user at the second user's device, as shown in FIGS. 2A and 2B.

7.1 Biometric Check

In one implementation shown in FIG. 2A, just before or at the start of the video call, the first device: captures a verification image or a verification video clip of the first user; extracts biometric data from the verification image or verification video clip; and confirms that these extracted biometric data match or sufficiently correspond to biometric data associated with the user's profile. For example, the first device can implement facial (re)recognition techniques to verify the identity of the user at the first device as the owner of the first user profile.

In one variation in which the first user profile is invited to the video call, the first device can also verify the identity of the user at the first device as the owner of the first user profile and selectively enable the user to access the video call accordingly.

7.2 Face/Look Model Selection

Upon confirming this correspondence, the first device can prompt the user to select from a set of available look models—stored in the user's profile or otherwise associated with the user—for the upcoming video call.

For example, after confirming the identity of the first user based on biometric data extracted from the verification image or verification video clip, the first device can access or generate a synthetic face image for each available look model linked to the user's profile, such as by injecting a nominal facial landmark container (e.g., representing an average smiling face) and each available look model into the synthetic face generator to generate a set of nominal synthetic face images representing this set of look models. The first device can then render these synthetic face images within the application and prompt the first user to select a synthetic face image from this set, as shown in FIGS. 2A and 2B.

In this example, the first device can also suggest or recommend a particular look model for the video call. For example, if the first user has elected the second user from a contact list or address book and previously associated look models in her profile with different groups of contacts, the first device can recommend a particular look model—from this set of available look models—associated with a contact group including the second user.

The first device can then retrieve a look model thus selected by the user (e.g., from local memory or from a remote database) and transmit a copy of this look model to the second user's device, as shown in FIGS. 2A and 2B. Alternatively, the first device can return this selection to the remote computer system, and the remote computer system can transmit a copy of the corresponding look model to the second user's device or otherwise enable the second device to access a copy of this look model. Accordingly, the second device can load and store a temporary copy of this look model from the first user's profile, such as for the duration of this video call.

7.4 Second Device

Therefore, prior to initiating a video call with the second device, the first device can interface with the first user to select a first look model of the first user, which defines how the first user is visually presented to the second user during the video call.

Prior to entering or at the start of the video call, the second device can access or download a local copy of the first look model of the first user, as shown in FIG. 2A. More specifically, prior to the video call, the first device (or the remote computer system) can automatically grant the second device permission to securely download the first look model, etc. selected by the first user.

Concurrently and prior to entering the video call, the second device can interface with the second user to select a second model of the second user, which defines how the second user is visually presented to the first user during the video call, as shown in FIG. 2B. Prior to entering or at the start of the video call, the first device can access or download a local copy of the second look model. More specifically, prior to the video call, the second device (or the remote computer system) can automatically grant the first device permission to securely download the first look model, etc. selected by the second user.

Therefore, in preparation for the video call: the first device can store a temporary local copy of the second look selected by the second user who was verified—such as via face detection—as the owner of the second look by the second device; and the second device can store a temporary local copy of the first look selected by the first user who was verified as the owner of the first look by the first device.

8. Video Call

Figure 2C:
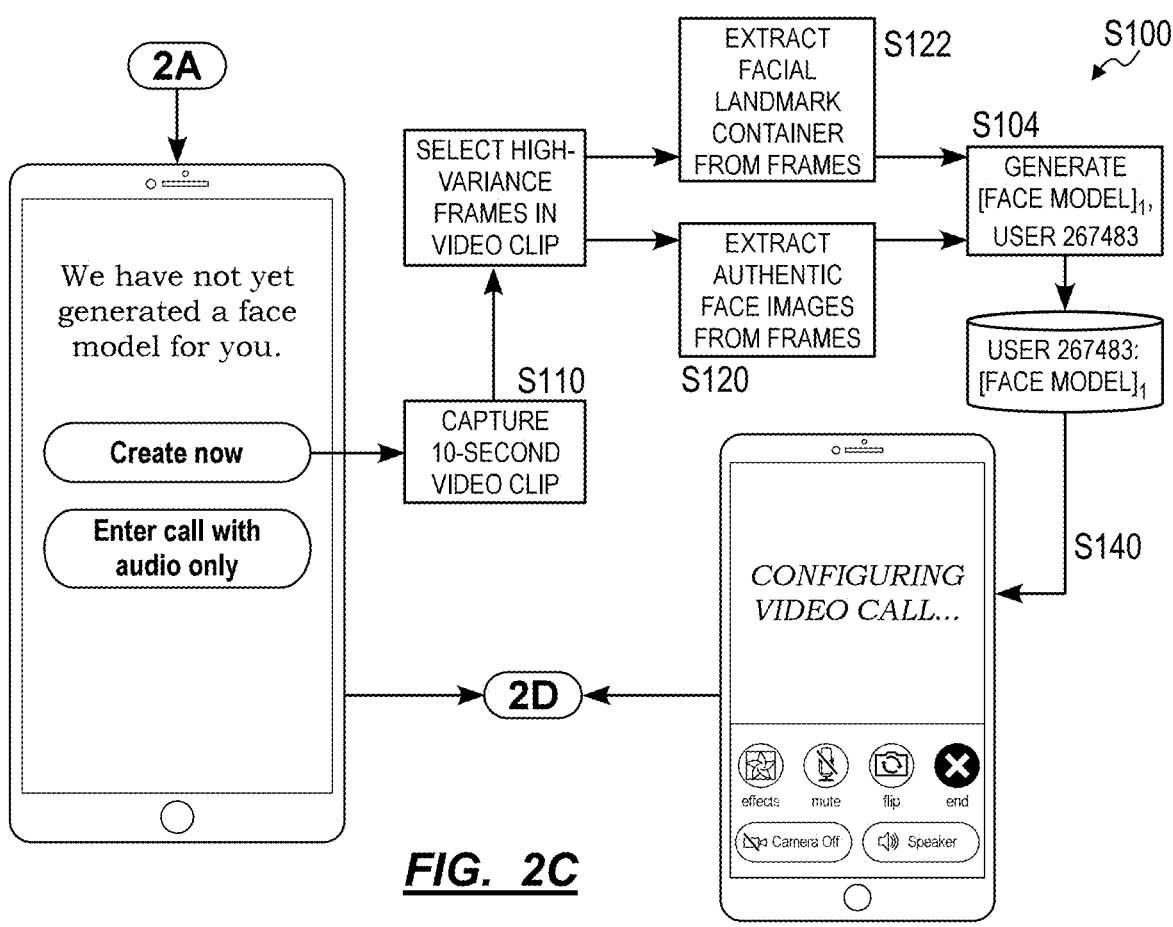

Then, during the video call, the first device can: capture a first live video feed in Block S110; implement a local copy of the facial landmark extractor to represent constellations of facial landmarks—detected in the first live video feed—in a first feed of facial landmark containers in Block S122; and transmit the first feed of facial landmark containers of the first user to the second device in Block S130 if this face is positively identified as the first user. Upon receipt, the second device can: transform the first feed of facial landmark containers and a local copy of the first look model of the first user into a first feed of synthetic face images according to the synthetic face generator in Block S150; and render the first feed of synthetic face images over the first background in Block S152, as shown in FIG. 2C.

Concurrently, the second device can: capture a second video feed in Block S110; implement a local copy of the facial landmark extractor to represent constellations of facial landmarks—detected in the second video feed—in a second feed of facial landmark containers in Block S122; and transmit the second feed of facial landmark containers of the second user to the first device in Block S130 if this face is positively identified as the second user. Upon receipt, the first device can: transform the second feed of facial landmark containers and a local copy of the second look model of the second user into a second feed of synthetic face images according to the synthetic face generator in Block S150; and render the second feed of synthetic face images over the second background in Block S152, as shown in FIG. 2C.

8.1 Facial Landmark Container Feeds

In particular, during the video call, the first device can: capture a first live video feed; implement facial (re)recognition techniques to intermittently confirm the identity of the user depicted in the first live video feed; compress the first live video feed into a first facial landmark container feed when the first user is verified; and stream the first facial landmark container feed to the second device in near real-time (e.g., with a maximum time of 50 milliseconds from capture to upload).

Concurrently, the second device can implement similar methods and techniques to: capture a second video feed of the second user; transform a second video feed into a second facial landmark container feed; and return the second facial landmark container feed to the first device.

8.2 Synthetic Face Image Feeds

During the video call, the second device renders a first background (e.g., selected by the first user) in a video call portal within a second instance of the application executing on the second device.

Upon receipt of a facial landmark container and a corresponding audio packet from the first device, the second device can: extract audio data from the audio packet; insert the facial landmark container and the first look model of the first user into a local copy of the synthetic face generator—stored in local memory on the second device—to generate a synthetic face image; and render the synthetic face image over the first background within the video call portal (e.g., to form a "first synthetic video feed") while playing back the audio data via an integrated or connected audio driver.

By repeating this process for each audio packet and facial landmark container received from the first device during the video call, the second device can thus generate and render a first synthetic video feed depicting the first user's face over the first background—synchronized to playback of an audio stream from the first device—in near real-time (e.g., with less than one second of latency).

The first device can implement similar methods and techniques during the video call to generate and render a second synthetic video feed depicting the second user's face over the second background—synchronized to playback of an audio stream from the second device—in near real-time.

8.3 Multi-User Video Call

The first and second devices can thus execute Blocks of the method S100 during the video call to exchange feeds of facial landmark containers, to transform these facial landmark containers into synthetic video feeds, and to render these synthetic video feeds for the first and second users. However, the first, second, and additional devices (e.g., three, six, 100) can execute these processes concurrently during a video call: to exchange feeds of facial landmark containers; to transform facial landmark containers received from other devices on the video call into synthetic video feeds; and to render these synthetic video feeds for their corresponding users.

9. Autopilot

Blocks S170 and S172 of the method S100 recite, at the first device, in response to detecting absence of the first user's face in the first video frame: retrieving an autopilot file containing a prerecorded sequence of non-speech facial landmark containers representing the first user in a predefined video call scenario; and transmitting the prerecorded sequence of non-speech facial landmark containers to the second device in place of facial landmark containers extracted from the first live video feed.

Generally, in response to manual or automatic activation of an autopilot mode (hereinafter a "trigger event") at the first device, the first device can transmit a prerecorded stream of facial landmark containers from an autopilot file in place of facial landmark containers extracted from a live video feed captured at the first device, as shown in FIG. 1.

Accordingly, the second device can access the first look model in preparation for a video call involving the first device. Then, during a first time period during the video call, the second device can: receive the first sequence of facial landmark containers from the first device; and transform the first sequence of facial landmark containers and the first face model into a first sequence of synthetic face images based on the synthetic face generator. Then, during a second time period responsive to a trigger event at the first device, the second device can: receive the prerecorded autopilot sequence of facial landmark containers from the first device; and transform the prerecorded autopilot sequence of facial landmark containers and the first face model into a second sequence of synthetic face images based on the synthetic face generator. The second device can render the first sequence of synthetic face images immediately followed by the second sequence of synthetic face images during the video call.

Therefore, the first and second devices can cooperate to seamlessly transition between generating synthetic face images of the user—based on live facial landmark containers and prerecorded autopilot facial landmark containers—such that the second user perceives no change in appearance or presence of the first user during the video call when the first user enters and exits the field of view of a camera at the first device or manually activates the autopilot mode.

9.1 Manual Triggers

In one implementation, during the video call, the first device renders a menu of predefined video call scenarios—linked to stored autopilot files unique to and stored in the user's profile—within the video call portal. When the first user selects a particular predefined video call scenario from this menu, the first device: mutes the first live video feed (or mutes extraction of facial landmark containers from this first live video feed); retrieves a particular autopilot file linked to this particular predefined video call scenario; extracts a sequence of non-speech facial landmark containers from the particular autopilot file; and streams this sequence of non-speech facial landmark containers to the second device (or to all other devices in the video call).

Accordingly, the second device: receives this sequence of non-speech facial landmark containers; injects this sequence of non-speech facial landmark containers and the first look model into the synthetic face generator to generate a sequence of synthetic face images that depict the first user exhibiting a response, expression, or action according to the particular predefined video call scenario; and renders this sequence of synthetic face images for the second user such that the second user sees the first user performing the predefined video call scenario and depicted according to the first look model.

Furthermore, following transmission of the sequence of non-speech facial landmark containers from the particular autopilot file, the first device can: retrieve the "neutral" autopilot file from the first user's profile; extract a sequence of non-speech facial landmark containers from the "neutral" autopilot file; and stream this sequence of non-speech facial landmark containers to the second device on a loop, such as until the first user selects an alternate predefined video call scenario from the menu or reactivates the first live video feed.

In particular, if the first user selects another predefined video call scenario from the menu, the first device can transition to streaming a sequence of non-speech facial landmark containers from the corresponding autopilot file before returning to streaming facial landmark containers from the "neutral" autopilot file.

Conversely, when the first user reactivates the first live video feed, the first device can: cease transmission of the sequence of non-speech facial landmark containers from the "neutral" autopilot file to the second device; automatically reactivate capture of the first live video feed; implement the facial landmark extractor to detect and extract facial landmark containers from this first live video feed; and stream these live facial landmark containers to the second device.

For example, the first device can: detect deactivation of the first live video feed—captured by the optical sensor in the first device—at a first time during the video call; and then stream prerecorded autopilot sequences of facial landmark containers to the second device accordingly. Then, the first device can: detect activation of the first live video feed; and exit the autopilot mode. Later, at a third time period during the video call, responsive to the exit of the autopilot mode, the first device can: receive a third sequence of frames captured by the optical sensor in the first device; detect the face, of the first user, in the third sequence of frames; generate a third sequence of facial landmark containers representing facial actions of the face of the first user; and transmit the third sequence of facial landmark containers to the second device for combination with the first look model. Accordingly, the second device can: generate a third synthetic image feed depicting facial actions of the first user during the third time period, according to the first look model.

9.1.1 Manual Triggers: Examples

For example, during a video call, the first user hears a knock on her front door. Accordingly, the first user manually activates the autopilot mode at the first device. The first device then automatically: mutes video (and audio) feeds at the first device; retrieves a "neutral" autopilot file; streams a sequence of non-speech facial landmark containers from the "neutral" autopilot file to the second device on a loop; and renders a menu of predefined video call scenarios for selection by the user while the autopilot mode is active. The first user then walks to her front door to sign for a delivery while carrying the first device.

During this period, the second user makes a joke. Upon hearing this joke at the first device, the first user manually selects the "laughing" video call scenario from the menu. Accordingly, the first device: retrieves the "laughing" autopilot file and the "attentive" autopilot file from the first user's profile; streams the sequence of non-speech facial landmark containers from the "laughing" autopilot file to the second device; then streams the sequence of landmark containers from the "attentive" autopilot file to the second device, such as three times on a loop according to playback options defined for the "laughing" and "attentive" autopilot files as described above; and then returns to streaming the sequence of landmark containers from the "neutral" autopilot file to the second device.

Once the first user takes receipt of the package and is ready to return her attention to the video call, she selects an option in the menu to disable the autopilot mode. Accordingly, the first device: reactivates the first live video feed; implements the facial landmark extractor to detect and extract facial landmark containers from this live first live video feed; and streams these live facial landmark containers to the second device.

Thus, in this example, the second user may perceive a seamless transition from a synthetic video feed based on the first live video frame at the first device to a synthetic video feed based on the stored "neutral" autopilot file and then to a synthetic video feed depicting an appropriate response from the first user to a joke based on the stored "laughing" autopilot file.

In a similar example, the first user can similarly deactivate the first live video feed and manually trigger select scenarios from the menu while using a latrine during a video call. In particular, the first user may: mute the first audio and video feeds at the first device; activate the autopilot mode, such as with the "neutral" video call scenario by default; continue to listen to the video call while walking to and using the latrine; manually select scenarios from the menu responsive to action on the video call that the user perceives from audio and/or synthetic video feeds from other users on the video call; and later reactivate the first live video feed once the first user has exited the latrine to trigger the first device to return to streaming facial landmark containers extracted from the first live video feed. In this example, the first device can execute Blocks of the method S100 to selectively transition between streaming facial landmark containers derived from the first live video feed and facial landmark containers from stored autopilot files of predefined video call scenarios based on manual inputs from the first user during this video call.

In yet another example, the first user may activate the autopilot mode while maintaining a live audio feed at the first device (e.g., a smartphone) and take a walk with the first device in her pocket while carrying on a conversation with a second user. The user may also intermittently: retrieve the first device; deactivate the autopilot mode and thus resume capture of the live video frame and transmission of facial landmark containers to the second device; and then articulate a key point to the second user before reactivating the autopilot mode and returning the first device to her pocket.

9.1.2 Remote Control

The foregoing implementations and examples are described as executed by the first device (e.g., a smartphone, a tablet) while the first device hosts a video call with a second device, streams facial landmark containers to the second device, generates and renders a second synthetic video feed based on facial landmark containers received from the second device, and presents a menu of predefined video call scenarios to the user for control of the autopilot mode within the video call.

Alternatively, the first device can include a laptop computer that hosts a video call with a second device, streams facial landmark containers to the second device, and generates and renders a second synthetic video feed based on facial landmark containers received from the second device. A peripheral device (e.g., a smartphone, a tablet, a smartwatch) wirelessly connected to the first device can: present the menu of predefined video call scenarios to the user; and return menu selections to the first device during the video call. The first device can then implement methods and techniques described above to transition between transmitting facial landmark containers extracted from a live video feed and transmitting facial landmark containers from stored autopilot files to the second device.

9.2 Automatic Autopilot+Predefined Video Call Scenarios

In one variation, the first device can: automatically activate the autopilot mode; automatically select predefined video call scenarios; and stream facial landmark containers from corresponding autopilot files to the second device.

In one implementation, the first device can: capture a first live video feed of first user; implement face tracking techniques to detect and track the face of the first user in the first live video feed; implement methods and techniques described above to extract facial landmark containers from the first user's face detected in live video frames in this first live video feed; and stream these facial landmark containers to the second device, as described above.

Later, in this implementation, in response to failing to detect the first user's face in the first live video feed—thereby preventing the first device from extracting facial landmark containers from this first live video feed—the first device can automatically: activate the autopilot mode at the first device; retrieve an autopilot file for a default video call scenario (e.g., the "neutral" non-speech autopilot file); extract a sequence of non-speech facial landmark containers from this autopilot file; and stream this sequence of non-speech facial landmark containers on a loop to the second device while continuing to capture and scan the first live video feed for the first user's face.

Later, upon detecting the first user's face in this first live video feed, the first device can: disable the autopilot mode; extract facial landmark containers from the first user's face detected in this first live video feed; and revert to streaming these live facial landmark containers to the second device.

Furthermore, in this implementation, the first device can default to streaming a prerecorded sequence of non-speech facial landmark containers from the "neutral" autopilot file to the second device upon activating the autopilot mode. Additionally or alternatively, the first device can: implement an expression classifier to detect the first user's expression in the first live video feed (e.g., based on facial expression and/or body language features detected in the first live video feed); and store the last expression of the first user detected in the first live video feed in a buffer. Then, upon detecting absence of the first user's face in the first video frame and activating autopilot, the first device can: identify a predefined video call scenario characterized by or labeled with an expression type nearest the last expression of the first user currently stored in the buffer; retrieve a non-speech autopilot file associated with this predefined video call scenario; extract a sequence of non-speech facial landmark containers from this non-speech autopilot file; and stream this sequence of non-speech facial landmark containers on a loop to the second device while continuing to scan the first live video feed for the first user's face.

Additionally or alternatively, upon detecting absence of the first user's face in the first video frame and activating the autopilot mode, the first device can: receive facial expressions detected in live video feeds at other devices on the video call; detect facial expressions in facial landmark containers received from these other devices on the video call; or detect facial expressions in synthetic video feeds generated locally based on facial landmark containers received from these other devices on the video call. The first device can then: identify a predefined video call scenario characterized by or labeled with an expression type nearest a most-common expression or an average expression across the other users on the video call; retrieve a non-speech autopilot file associated with this scenario; extract a sequence of non-speech facial landmark containers from this autopilot file; and stream this sequence of non-speech facial landmark containers on a loop to the second device while continuing to capture and scan the first live video feed for the first user's face. Furthermore, in this implementation, the first device can repeat this process to select different autopilot files that approximate expressions of other users on the video call and to stream facial landmark containers from these matched autopilot files to these other devices while the user remains out of the field of view of the camera at the first device. The first device can therefore selectively stream prerecorded sequences of facial landmark containers to other devices on the video call based on expressions of other users on the video call such that the first user appears to follow the "wisdom of the crowd" in this video call.

Therefore, in the foregoing implementation, during the video call, the first device can: detect the face of the first user in the first sequence of frames in Block S115 and generate the first sequence of facial landmark containers in Block S122. Then, for a first frame in the first sequence of frames, the first device can: scan the first frame for the face of the first user; detect the face in a region of the first frame; extract a first set of facial landmarks representing facial actions of the face of the first user from the region of the first frame in Block S120; and store the first set of facial landmarks in a first facial landmark container, in the first sequence of facial landmark containers. Then, for a last frame in the first sequence of frames, the first device can: scan the last frame for the first face of the user; detect the trigger event based on absence of the face in the last frame; and enter the autopilot mode in Block S192.

Furthermore, during activated autopilot mode, the first device can: scan each frame, in the second sequence of frames, for the face of the first user; and exit the autopilot mode in response to detection of the first face of the first user in the last frame in the second sequence of frames in Block S18o. Later, during the video call, responsive to exiting the autopilot mode, the first device can: receive a third sequence of frames captured by the optical sensor in the first device; detect the face, of the first user, in the third sequence of frames; generate a third sequence of facial landmark containers representing facial actions of the face of the first user detected in the third sequence of frames; and transmit the third sequence of facial landmark containers to the second device for combination with the first look model. Accordingly, the second device can: generate a third synthetic image feed depicting facial actions of the first user during the third time period, represented in the third sequence of facial landmark containers, according to the first look model, as shown in FIG. 6.

In other examples, the first device can automatically activate the autopilot mode in response to: detecting a phone ringing or a door opening in an audio feed; or detecting a shift in the first user to a particular mood or emotion; etc. The first device can similarly automatically deactivate the autopilot mode in response to various triggers, such as specified by the first user prior to or during the call.

9.2.1 Insufficient Facial Landmark Count

In one variation, the first device can: receive a first sequence of frames captured by the optical sensor in the first device; detect facial landmarks of the face of the first user; and automatically activate the autopilot mode in response to detection of insufficient facial landmarks.

In one implementation, during the video call, the first device can: detect facial landmarks of the face, of the first user, in the first sequence of frames, according to a facial landmark threshold; and detect the trigger event based on facial landmarks of the face, of the first user, falling below the facial landmark threshold. Then, during activated autopilot mode, the first device can: receive a second sequence of frames captured by the optical sensor in the first device; scan each frame, in the second sequence of frames, for facial landmarks of the face of the first user; and, in response to detecting facial landmarks of the first user exceeding the facial landmarks threshold, in a last frame in the second sequence of frames, exit the autopilot mode. Later, upon exiting the autopilot mode, the first device can: receive a third sequence of frames captured by an optical sensor in the first device; detect the face, of the first user, in the third sequence of frames; detect facial landmarks of the face, of the first user, according to the facial landmarks threshold; generate a third sequence of facial landmark containers representing facial actions of the face of the first user detected in the third sequence of frames; and stream the third sequence of facial landmark containers to the second device for combination with the first look model. Accordingly, the second device can: generate a third synthetic image feed depicting facial actions of the first user, represented in the third sequence of facial landmark containers, according to the first look model.

9.2.2 Computational Load

In one variation, the first device can: track a computational load of the first device; detect a trigger event; enter an autopilot mode; retrieve a prerecorded autopilot sequence of facial landmark containers from a memory in the first device; and stream the prerecorded autopilot sequence of facial landmark containers to the second device.

In one implementation, during the video call, the first device can: track the computational load of the first device; detect the trigger event of the computational load of the first device exceeding a first computational load threshold; and enter the autopilot mode. Then, during activated autopilot mode, the first device can: track the computational load of the first device; and exit the autopilot mode in response to the computational load of the first device falling below a second computational load threshold less than the first computational load threshold. Later, upon exiting the autopilot mode, the first device can: receive a third sequence of frames captured by an optical sensor in the first device; detect the face, of the first user, in the third sequence of frames; generate a third sequence of facial landmark containers representing facial actions of the face of the first user detected in the third sequence of frames; and stream the third sequence of facial landmark containers to the second device for combination with the first look model. Accordingly, the second device can: generate a third synthetic image feed depicting facial actions of the first user, represented in the third sequence of facial landmark containers, according to the first look model.

Therefore, the computational load of the first device is reduced by offloading generation of the second synthetic video feed to the second device and enables the first user to access and operate other applications at the first device.

9.3 Autonomous Autopilot with Ad Hoc Facial Landmark Container Feeds

In a similar variation, rather than store prerecorded autopilot files of the user exhibiting predefined video call scenarios, the first device stores prerecorded autopilot files of the user exhibiting various expressions.

Accordingly, in this variation, the first device can selectively stream a sequence of non-speech facial landmark containers from prerecorded autopilot files in the first user's account based on expressions of other users on the video call such that synthetic video feeds—generated based on the first user's look model and facial landmark containers received from the first device and rendered on other devices in the video call—present the first user with the same or similar expressions as other users on the video call.

In one implementation, once the autopilot mode is activated, the first device can: select a second user on the video call; track expressions of the second user; and stream a sequence of prerecorded facial landmark containers—from autopilot files in the first user's profile—that approximate expressions of the second user over a period of time (e.g., up to ten seconds or until the second user begins to speak). The first device can then: switch to a third user on the video call; track expressions of the third user; and stream a sequence of prerecorded facial landmark containers—from autopilot files in the first user's profile—that approximate expressions of the third user over a next period of time (e.g., up to ten seconds or until the third user begins to speak). The first device can continue this process until the autopilot mode is deactivated at the first device.

In another implementation, once the autopilot mode is activated, the first device can: track expressions of each other user on the video call; calculate an "average" or a mode of these expressions; and stream a sequence of prerecorded facial landmark containers—from autopilot files in the first user's profile—that approximate the "average" or mode of these expressions.

In this variation, the first device can: similarly characterize motion of one or more faces in facial landmark container feeds or synthetic video feeds for other users on the call; and shift positions of facial landmarks in facial landmark containers—streamed to other devices on the video call—according to motion of these other faces such that the first user appears to other users on the video call as similarly animated during autopilot periods at the first device.

For example, during the video call, the first device can: receive a first sequence of frames captured by the optical sensor in the first device; interpret a first emotion of the first user based on facial features of the first user detected in the first sequence of frames; access a set of prerecorded autopilot sequences of facial landmark containers representing the first user exhibiting a set of discrete emotions; and retrieve the prerecorded autopilot sequence of facial landmark containers, from the set of prerecorded autopilot sequence of facial landmarks containers stored in the memory of the first device, associated with the first emotion.

Therefore, the first device can interpret an emotion of the first user and retrieve the prerecorded autopilot sequence of facial landmark containers from the memory, associated with this emotion, and stream a synthetic face image depicting this emotion to the other devices on the video call during autopilot mode.

9.4 Ad Hoc Facial Landmark Container Feeds During Non-Speech Period

In a similar variation, the first device generates a prerecorded autopilot file of the user based on facial landmark containers extracted from images of the first user—captured during the same or earlier video call—depicting the first user not speaking.

For example, prior to activation of the autopilot mode during a video call, the first device can: access an audio feed captured by a microphone in the first device; detect absence of speech in the audio feed during a first time interval; select a subset of facial landmark containers, in the first sequence of facial landmark containers, corresponding to the first time interval; and store the subset of facial landmark containers as the prerecorded autopilot sequence of facial landmark containers in the memory. Later, during activated autopilot mode, responsive to a trigger event, the first device can: again access the audio feed captured by the microphone in the first device; and scan the audio feed for speech. In response to detecting absence of speech in the audio feed, the first device can stream the prerecorded autopilot sequence of facial landmark containers—stored in memory—to the second device.

Conversely, in response to detecting speech in the audio feed, the first device can execute methods and techniques described below to stream facial landmark containers that represent this speech detected in the audio feed.

9.5 Autopilot Feedback

Furthermore, in the foregoing implementation, when the autopilot mode is active at the first device, the first device can broadcast an "autopilot flag" to other devices on the video call. Upon receipt of this autopilot flag from the first device, a second device on this video call can render an icon or other visual indicator over or adjacent the synthetic video feed—generated from prerecorded facial landmark containers received from the first device—in order to indicate to a second user that the autopilot mode is active at the first device, as shown in FIG. 1.

For example, during activated autopilot mode, the first device can broadcast the autopilot flag to the second device. Then, the second device can: receive the autopilot flag; and render a visual icon adjacent a second sequence of synthetic face images, indicating activation of the autopilot mode at the first device to the second user.

Alternatively, during activated autopilot mode, the first device can broadcast an autopilot flag to a set of devices. Accordingly, the set of devices can: receive the autopilot flag from the first device; and render a visual icon adjacent the synthetic image feed at each device, the visual icon indicating activation of the autopilot mode at the first device.

Therefore, the autopilot flag and visual icon can serve as a notice to other users on the video call that the autopilot mode has been activated at the first device.

10. Autopilot Emotion

In one variation, the first device can implement methods and techniques similar to those described in U.S. patent application Ser. No. 17/192,828, filed on 4 Mar. 2021, to adjust types and/or magnitudes of emotions expressed in autopilot files, such as before or after activating the autopilot mode during a video call or while configuring autopilot filed before a video call.

In one implementation, during the video call, the first device can: receive the first sequence of frames captured by the optical sensor in the first device; interpret a first emotion of the first user based on facial features of the first user detected in the first sequence of frames; retrieve the prerecorded autopilot sequence of facial landmark containers from the memory by accessing a set of prerecorded autopilot sequences of facial landmark containers representing the first user exhibiting a set of discrete emotions and by retrieving the prerecorded autopilot sequence of facial landmark containers, from the set of prerecorded autopilot sequence of facial landmark containers, associated with the first emotion.

For example, in order to generate the first sequence of facial landmark containers, the first device can: initialize a first facial landmark container, in the first sequence of facial landmark containers, for a target frame in the first sequence of frames. Additionally, for each action unit, in a predefined set of action units representing action of human facial muscles, the first device can: detect a facial region of the first user, depicted in the target frame, containing a muscle associated with the action unit; interpret an intensity of action of the muscle based on a set of features extracted from the facial region depicted in the first sequence of frames; and represent the intensity of action of the muscle in the first facial landmark container. Then, the first device can detect a trigger event. Later, during activated autopilot mode, the first device can: retrieve a first prerecorded autopilot facial landmark container representing intensities of actions of muscles, associated with the predefined set of action units, corresponding to the first emotion; and stream the prerecorded autopilot facial landmark container representing intensities of actions of muscles to the second device for combination with the first look model. Accordingly, the second device can generate the second synthetic image feed.

Therefore, during activated autopilot mode, the synthetic image feed can depict emotions based on facial features and the intensity of action of the muscles in the face of the first user.

11. Pre-Distributed Autopilot File

In one variation, in preparation for or at the start of a video call with the first user, the second device downloads and stores local copies of a population of prerecorded autopilot files in the first user's profile. Then, during the video call, the first device: implements methods and techniques similar to those described above to detect autopilot triggers automatically or to record manual autopilot controls entered by the first user; and then transmits autopilot commands to the second device accordingly—rather than synthetic face images generated locally according to autopilot files from the first user's profile. Thus, upon receipt of an autopilot command from the first device, the second device can implement methods and techniques described above to generate a synthetic video feed with the first user's look model and a local copy of an autopilot file—from the first user's profile—specified by the first device.

Furthermore, in this variation, the second device can implement similar methods and techniques to generate a synthetic video feed depicting the user according to local copies of prerecorded autopilot files in the first user's profile during loss of connectivity to the first device or in response to delayed or failed receipt of a facial landmark container from the first device during the video call.

12. Live Autopilot File: User Selection

In one variation, the first device cooperates with the user to generate an autopilot file on-the-fly during a video call.

For example, in preparation for selecting the autopilot mode while in a video call, the first user may select an "autopilot record" control. The first device can then: store a sequence of non-speech facial landmark containers extracted from a subsequent sequence of video frames captured at the first device; assemble this sequence of non-speech facial landmark containers into an autopilot file; and store this autopilot file locally or automatically transmit this autopilot file to the second device. Later, when the first user triggers the autopilot mode—such as manually or by stepping out of the field of view of the camera at the first device—the first device can automatically activate the autopilot mode and trigger the second device to generate synthetic face images according to this on-the-fly autopilot file.

12.1 Live Autopilot File: Other Users

In one variation, while the autopilot mode is active at the first device, the first device combines concurrent facial landmark containers inbound from other devices on the video call to generate an autopilot sequence of facial landmark containers for the first user and returns this autopilot sequence of facial landmark containers to these other devices.

In one example, during the video call, the first device can transmit the first sequence of facial landmark containers to a set of devices, including the second device, for combination with local copies of the first look model. Accordingly, the second device can: generate synthetic image feeds depicting facial actions of the first user during the first time period. Later, during activated autopilot mode, the first device can: construct the autopilot sequence of facial landmark containers by receiving a first inbound set of facial landmark containers, from the set of devices, representing the faces of the users on the set of devices at a first time; calculating a first combination of the first inbound set of facial landmark containers; and storing the first combination of the first inbound set of facial landmark containers as a first autopilot facial landmark container in the autopilot sequence of facial landmark containers.

In a similar example, the first device can: generate synthetic image feeds of other users on the video call based on their corresponding look models and inbound facial landmark containers; scan the set of inbound facial landmark containers and/or these synthetic image feeds for common attributes (e.g., head motions, expressions, emotions, and mouth and eye actions); retrieve the stored autopilot sequence of facial landmark containers exhibiting similar attributes; and return these autopilot sequences of facial landmark containers to these other devices.

Alternatively, the first device can modify the existing autopilot sequence of facial landmark containers for the first user to represent these common attributes, or generate a new autopilot sequence of facial landmark containers that represents these common attributes and return this autopilot sequence of facial landmark containers to these other devices.

Therefore, the first device can combine inbound facial landmark containers representing other users on the video call to generate an autopilot sequence of facial landmark containers that mimics emotions, expressions, facial actions, and head (and body) movements of other users on the call; and streams these autopilot sequence of facial landmark containers back to these other devices such that their users perceive the first user as similarly engaged in the video call.

13. Autopilot Video File

In one variation, the first device and the second device cooperate to render a prerecorded video clip of the first user—rather than a synthetic video clip generated from facial landmark containers and a look model of the first user—when the autopilot mode is activated at the first device. Therefore, in this variation, the first device, the second device, and a remote database can store autopilot files containing prerecorded video clips of the first user, such as instead of or in addition to autopilot files containing sequences of facial landmark containers.

14. Speech-Type Autopilot

In one variation of the method, the application selectively streams a sequence of speech-type facial landmark containers—representing a sequence of mouth shapes corresponding to speech—to other devices in a video call responsive to detecting speech in an audio feed at the user's device while the autopilot mode is active at the user's device. The application can concurrently stream the audio feed to these other devices, which may then: fuse this sequence of speech type facial landmark containers with a copy of the user's look model to generate a sequence of synthetic face images that depict the user speaking; and render these synthetic face images while replaying the audio feed. Accordingly, other users viewing these other devices may perceive the user—depicted according to her look model—speaking despite absence of a video feed or absence of the user in a raw video feed at her device.

In particular, in this variation, when the application is active at a user's device, the application can selectively: a) stream non-speech facial landmark containers—representing the user's face without speech-like mouth movements—to other devices in a video call when no speech is detected in an audio feed at the device; and b) stream speech-type facial landmark containers—representing the user's face with specific or generic speech-like mouth movements—to other devices in a video call when speech is detected in the audio feed at the device. Thus, when the user's face is not accessible to the application (e.g., when a video feed is inactive at the device and/or when the user has moved outside of the field of view of a camera integrated into or connected to the device), the application can execute this variation of the method to stream facial landmark containers that approximate true speech-related mouth movements of the user based on presence or absence of speech detected in an audio feed captured at the device. Other devices in the video call can then reconstruct and render synthetic video feeds containing authentic-like representations of the user based on these facial landmark containers, thereby enabling other users at these devices to visualize both the user's silence and speech despite the user's absence in live video feed at the device.

For example, the application can execute this variation of the method when the user walks away from her device—such as to retrieve a tissue or pen and paper—while maintaining a conversation with other users on a video call. In another example, the application can execute this variation of the method: to stream non-speech facial landmark containers to other devices in the video call when the user mutes her video, such as while eating; and to stream speech-type facial landmark containers to other devices in the video call when the user interjects with comments during the call while her video remains muted.

In another example, a remote computer system can execute this variation of the method on behalf of a user when the user telephones into a video call (e.g., does not have access to a camera) in order to generate and stream non-speech and speech-type facial landmark containers—previously generated and stored in the user's profile—to other devices in this video call, thereby enabling these other devices to generate and render synthetic face images that correspond to the user's intermittent silence and speech and thus enabling these other users to visualize the user despite absence of a live video feed of the user during the video call.

14.1 Baseline Speech Detection+Recorded Generic Speech Visualization

In one implementation, when the user activates the autopilot mode described above, the application can transition to streaming a stored, pre-generated sequence of non-speech facial landmark containers—representing motion of the user's face without mouth movements that correspond to speech—to other devices in the video call, as described above.

Upon activation of the autopilot mode, the application can also scan an audio feed at the user's device for speech or speech characteristics (e.g., phonemes). Upon detecting speech in the user's audio feed, the application can transition to streaming a stored, pre-generated sequence of speech-type facial landmark containers—representing motion of the user's face with mouth movements that correspond to generic speech—to other devices in the video call.

14.1.1 Prerecorded Sequences of Non-Speech Facial Landmark Containers

In one implementation, during a face model creation period or autopilot configuration period preceding the video call, the application interfaces with the user to capture sequences of non-speech facial landmark containers.

In one example, during a face model creation period or autopilot configuration period, the application: prompts the user to remain silent but pay attention to playback of a video conference recording; replays the conference recording (e.g., including 45 seconds of recorded video feeds of a group of participants discussing autopilot modes and options within video calls); captures a sequence of frames depicting the user viewing playback of the video conference recording; implements methods and techniques described above to detect facial landmark containers in these frames and to generate a sequence of facial landmark containers depicting the user during playback of the video conference recording; and stores this sequence of facial landmark containers—as a sequence of attentive, non-speech facial landmark containers—in the user's profile.

Therefore, in this implementation, the application can interface with the user to: record sequences of frames depicting the user present (and attentive) at a device but not speaking; extract a sequence of facial landmark containers representing positions of landmarks across the user's face from these frames; and store these facial landmark containers in the user's profile as a sequence of attentive, non-speech facial landmark containers.

In one variation, the computer system implements similar methods and techniques to generate sequences of laughing, expressing concern, bored, responding to a loud noise, attentive, contemplative, in agreement, in disagreement, and neutral engagement non-speech facial landmark containers and can store these sequences of non-speech facial landmark containers in the user's profile, such as described above.

14.1.2 Prerecorded Sequences of Speech-Type Facial Landmark Containers

Similarly, during this face model creation period or autopilot configuration period preceding the video call, the application can also interface with the user to capture a sequence of speech-type facial landmark containers representing mouth shapes corresponding to generic speech.

In one implementation, the application: prompts the user to confirm or elect a language (e.g., English, French, Mandarin); and presents a script of words that, when spoken, produce a sequence of mouth shapes characteristic of speech in the selected language (or "generic speech"). For example, if the user elects "English," the application can retrieve a generic speech script that reads: "watermelon applesauce, watermelon applesauce, watermelon applesauce, watermelon applesauce, watermelon applesauce, watermelon applesauce, watermelon applesauce, watermelon applesauce, watermelon applesauce, watermelon applesauce, watermelon applesauce, watermelon applesauce, watermelon applesauce, watermelon applesauce, etc."

In this implementation, the application can then: prompt the user to read the script—with nominal or baseline enthusiasm—out loud; capture a sequence of frames depicting the user reading the script out loud; implement methods and techniques described above to detect facial landmark containers in these frames and to generate a sequence of facial landmark containers depicting the user reading the script; and store this sequence of facial landmark containers—as a sequence of baseline speech-type facial landmark containers—in the user's profile.

Therefore, in this implementation, the application can interface with the user to: record sequences of frames depicting the user speaking a sequence of phonemes representative of generic human speech in a particular language according to a predefined script; extract a sequence of facial landmark containers representing positions of landmarks across the user's face from these frames; and store these facial landmark containers in the user's profile as a sequence of baseline, speech-type facial landmark containers.

In one variation, the computer system can implement similar methods and techniques to: prompt the user to read the script with various tones and intensities, such as loudly, softly, happily, angrily, nonchalantly, with great enthusiasm, etc.; capture sequence of frames depicting the user reading the script out loud with this tones and intensities; implement methods and techniques described above to detect facial landmark containers in these frames and to generate sequences of facial landmark containers depicting the user reading the script with these tones and intensities; and store these sequences of facial landmark containers—as sequences of speech-type facial landmark containers labeled with corresponding tones and intensities—in the user's profile.

For example, during the video call, the first device can access an audio feed captured by a microphone in the first device and in response to detecting presence of speech, extract a first sequence of phonemes from the audio feed during a first time interval. Then, during activation of an autopilot mode, the first device can retrieve a prerecorded autopilot sequence of facial landmark containers from a memory by: accessing a set of prerecorded autopilot sequence of speech-type facial landmark containers representing vocal signals of the first user; and retrieving the prerecorded autopilot sequence of speech-type facial landmark containers, from the set of prerecorded autopilot sequence of speech-type facial landmarks containers, associated with the first sequence of phonemes. Later, during activated autopilot mode, the first device can transmit the prerecorded autopilot sequence of facial landmark containers to a second device by: transmitting the prerecorded autopilot sequence of speech-type facial landmark containers to the second device for combination with the first look model to generate a second synthetic image feed.

14.1.3 Autopilot Activation

Later, during a video call, the application can: interface with the user to select a look model; enable other devices within the video call to access the look model; access a video feed from a camera in the user's device; detect and track a face in the video feed; extract a sequence of facial landmark containers from the face detected in the video feed; and stream these facial landmark containers to other devices in the video call, which then fuse these facial landmark containers and the look model to generate a feed of synthetic face images representing the user's real-time position, expression, and physiognomy at her device.

During the video call, if the device fails to detect the user's face in the video feed or if the user manually activates the autopilot mode as her device, the application can activate an "autopilot" function. Once the autopilot mode is active at the device, the application can: retrieve a sequence of baseline non-speech facial landmark containers stored in the user's profile; stream these baseline non-speech facial landmark containers—on a loop—to other devices in the video call.

14.1.4 Speech Detection

Furthermore, once the autopilot mode is active at the device, the application can monitor an audio feed captured by a microphone in (or connected to) the device or monitor a live transcript of the video call for human speech near the device.

For example, the application can: access a live audio feed output by a microphone in the device; implement noise cancelation techniques to remove—from this live audio feed—audio output by a speaker in (or connected to) the device, such as speech from other users on the video call; and implement speech detection and/or speech recognition to identify human speech in the denoised live audio feed, which may correspond to speech by the user.

In another example, the application can: access a live transcript of the video call, such as generated by a video chat hosting service hosting the video call; and implement natural language processing to detect indicators of speech by the user in the live transcript.

If the application fails to detect speech at the device, the application can continue to stream baseline non-speech facial landmark containers—on a loop—to other devices in the video call. Additionally or alternatively, the application can execute methods and techniques described above to selectively access and stream other sequences of non-speech facial landmark containers to other users on the video call based on scenarios or expressions selected by the user (e.g., via remote control) or based on emotions detected in speech or facial expressions of other users on the video call.

14.1.5 Speech Detected

However, upon detecting speech at the device—which may correspond to speech by the user—the application can: retrieve a sequence of baseline non-speech facial landmark containers from the user's profile; and stream these facial landmark containers to other users on the video call.

In particular, though the user is not present in a video feed captured by a camera in (or connected to) her device, the user may nonetheless continue to participate in the video call. For example, the user may be engaged in conversation within the video call but step away from her device to retrieve a pen and paper, or a tissue.

The application can thus: detect both absence of the user in the video feed captured by the device and presence of speech in an audio feed captured by the device; and stream a stored sequence of baseline, speech-type facial landmark containers—representing facial landmark containers of the user when speaking a generic sequence of phonemes—to other devices in the video call.

These other devices can then fuse these baseline, speech-type facial landmark containers and the user's look model to generate a feed of synthetic face images representing the user's real-time position, expression, and physiognomy at her device and approximating the user's mouth movements while speaking.

14.1.6 Speech Speed

In this implementation, upon detecting speech at the device while autopilot is active, the application can also characterize speech rate (or "speed") of the user, such as based on the rate of vowel phonemes detected in the audio feed; and adjust a transmit rate of the sequence of speech-type facial landmark containers to other devices in the video call based on this speech rate.

For example, the application can: increase the transmit rate of the sequence of speech-type facial landmark containers by up to 10% in response to detecting very fast speech; and decrease the transmit rate of the sequence of speech-type facial landmark containers by up to 30% in response to detecting very slow speech or speech with a high rate of speech breaks (e.g., "um").

14.1.7 Speech Characteristics and Speech-Type Facial Landmark Container Transitions In one variation, upon detecting speech at the device while autopilot is active, the application can also: detect characteristics of speech in the audio feed; modify facial landmarks in the stored sequence of speech-type facial landmark containers based on these speech characteristics; and stream these modified facial landmark containers to other devices in the video call.

For example, the application can implement speech detection and characterize techniques to interpret emotion and speech intensity (or speech loudness) in the audio feed. In this example, the application can then modify facial landmarks in the sequence of speech-type facial landmark containers accordingly. In particular, the application can implement methods and techniques described in U.S. patent application Ser. No. 17/533,534 to shift facial landmarks in these facial landmark containers—representing a baseline or nominal emotion—to represent an emotion detected in the speech (e.g., based on an emotion model).

Additionally or alternatively, responsive to louder or higher-intensity speech, the application can scale (i.e., lengthen) distances between a subset of facial landmarks—that represent the user's mouth in the sequence of facial landmark containers—and the center of the mouth. Thus, synthetic face images—generated according to these facial landmark containers and the user's face model—may depict the user opening her mouth wider, which may better match the louder or higher-intensity speech detected by the application. The application can similarly shorten distances between this subset of facial landmarks—that represent the user's mouth—and the center of the mouth responsive to quieter or lower-intensity speech detected in the audio feed.

14.1.8 Speech Cessation

Furthermore, once the application detects absence of speech in the audio feed captured at the device (or "speech cessation"), the application can return to streaming the sequence of non-speech facial landmark containers to other devices in the video call.

14.1.9 Prerecorded Mouth Shapes

In one variation, the application interfaces with the user to record snippets of (i.e., one or a short sequence of) facial landmark containers representing the user forming common mouth shapes corresponding to key phonemes, such as "Em," "Es," "Th," "Fff," "Eh," "Ah," and "Um" phonemes.

In this variation, during a setup period prior to the video call, the application can: prompt the user to recite a particular phoneme—with nominal or baseline enthusiasm—out loud; capture a snippet of frames depicting the user reciting the particular phoneme; implement methods and techniques described above to detect facial landmark containers in these frames and to generate a snippet of facial landmark containers depicting the user reciting the particular phoneme and store this snippet of facial landmark containers as a snippet of baseline phoneme-specific facial landmark containers—for the particular phoneme—in the user's profile.

Therefore, this snippet of baseline phoneme-specific facial landmark containers can define facial landmarks that represent a mouth shape corresponding to recitation of a particular phoneme by the user.

Later, upon detecting speech in the audio feed at the user's device during a video call while the autopilot mode is active at the user's device, the application can: stream the sequence of speech-type facial landmark containers—stored in the user's profile—to other devices in the video call; scan speech in the audio feed for key phonemes associated with snippets of phoneme-specific facial landmark containers stored in the user's profile; and selectively serve these snippets of phoneme-specific facial landmark containers to other devices in the video call—in place of the sequence of speech-type facial landmark containers—responsive to detecting corresponding phonemes in the audio feed.

Therefore, the application can interject snippets of baseline phoneme-specific facial landmark containers—that represent mouth shapes corresponding to recitation of particular phonemes by the user—into the sequence of speech-type facial landmark containers in order to generate a steam of facial landmark containers that more closely approximate mouth shapes made by the user while speaking during the video call with the autopilot mode active.

14.1.10 Autopilot Deactivation

While the autopilot mode is active, the application can continue to scan the video feed for the user's face and then automatically deactivate the autopilot mode upon detecting the user's face.

Additionally or alternatively, if the user manually activated the autopilot mode, the application can deactivate the autopilot mode only responsive to input by the user.

Upon deactivating the autopilot mode, the application can transition back to: extracting facial landmark containers representing the user's face in individual frames of the video feed; and streaming these facial landmark containers to other devices in the video call.

14.2 Real-Time Speech-Type Facial Landmark Container Recordation

In one variation, rather than prerecord a sequence of speech-type facial landmark containers for the user, the application automatically captures and refines a sequence of speech type facial landmark containers—representing generic speech—based on video frames captured by the device and depicting the user speaking during the video call.

For example, when the application detects the user in a video feed at the device and detects speech in an audio feed at the device during a video call, the application can: extract a first sequence of speech-type facial landmark containers from these video frames; extract a first sequence of concurrent phonemes from the audio feed; calculate a first score representing proximity of the first sequence of phonemes to "generic speech" (such as a sequence of phonemes for "watermelon applesauce"); and label the first sequence of speech-type facial landmark containers with the first score.

The application can then: extract a next sequence of speech-type facial landmark containers from subsequent video frames; extract a next sequence of concurrent phonemes from the audio feed; calculate a second score representing proximity of the second sequence of phonemes to "generic speech"; and replace the first sequence of speech-type facial landmark containers with the second sequence of speech-type facial landmark containers in memory if the second score exceeds the first score.

The application can repeat this process to incrementally detect, generate, and store sequences of speech-type facial landmark containers that more closely approximate generic speech as the user speaks and is visible in a live video feed during a video call.

Later, during the same or other video call, the application can stream the last stored sequence of speech-type facial landmark containers to other devices in the video call in response to detecting speech at the user's device while the autopilot mode is active.

14.2 Generic Speech Mouth Shape Projection

In another variation, the application streams a stored sequence of non-speech facial landmark containers to other devices in the video call when the autopilot mode is active but the application detects no speech in the concurrent audio feed. In this variation, the application then projects a snippet of relative facial landmark positions—representing mouth shapes corresponding to generic speech—onto these stored non-speech facial landmark containers and streams these modified facial landmark containers to other devices in the video call upon detecting speech in the audio feed at the device.

In one implementation, the application: retrieves a sequence of mouth-shape facial landmark groups representing generic speech, such as previously generated from video clips of another user speaking; and replaces facial landmarks—corresponding to the user's mouth—in the sequence of non-speech facial landmark containers with facial landmarks from the sequence of mouth-shape facial landmark groups, such as located relative to nose facial landmarks and a longitudinal axis of the user's face represented in these non-speech facial landmark containers.

In a similar implementation, the application: selects a first facial landmark container in the sequence of non-speech facial landmark containers; isolates a subset of mouth-type facial landmarks representing the user's mouth in the first facial landmark container; selects a first mouth-shape facial landmark group; shifts the subset of mouth-type facial landmarks—by shortest possible distances—to match the relative positions of corresponding facial landmarks in the first mouth-shape facial landmark group; shifts other non-mouth facial landmarks around the subset of mouth-type facial landmarks to maintain relative distances between linked mouth and non-mouth facial landmarks in the first facial landmark container (e.g., relative positions between lower lip and chin facial landmarks, relative positions between upper lip and nose facial landmarks); transmits this first modified facial landmark container to other devices in the video call; and repeats this process for next facial landmark containers in the sequence of non-speech facial landmark containers and next mouth-shape facial landmark groups while the application detects speech at the device.

Therefore, in this variation, the application can: map a sequence of mouth-type facial landmark containers—representing mouth shapes corresponding to generic speech—to non-speech facial landmark containers depicting the user to construct speech-type facial landmark containers; and then stream these constructed speech-type facial landmark containers to other devices in the video call while the autopilot mode is active and speech is detected at the device.

14.3.1 Other Speech Characteristics

In this variation, the application can also: detect loudness of speech at the device; select a particular sequence of mouth-shape facial landmark groups—representing generic speech and matched to the loudness of detected speech—from a set of mouth-shape facial landmark group sequence corresponding to different speech volumes or intensities; implement methods and techniques to map the particular sequence of mouth-shape facial landmark groups to the sequence of non-speech facial landmark containers; and then stream these constructed speech-type facial landmark containers to other devices in the video call while the autopilot mode is active and speech is detected at the device.

14.4 User-Specific Learned Mouth-Shape Facial Landmark Groups for Phonemes

In another variation, the application can learn a sequence of facial landmark containers that represent the user speaking individual phonemes or groups of consecutive phonemes (e.g., "Em," "Es," "Th," "F/Ph," "Eh," "Ah," and "Um").

In this variation, as the user engages in one or more video call over time, the application can collect facial landmark container and phonemes pairs, the former extracted from video frames and the latter extracted from a concurrent audio feed or automated transcript. The application and/or a remote computer system can then construct a speech model that predict facial landmarks for the user's whole face, lower face, or mouth specifically based on phoneme detected in an audio feed.

In particular, during a video call, the application can: access a video feed from the user's device; extract training facial landmark containers from video frames in this video feed; access an audio feed from the user's device; implement a speech detection module to detect a string of phonemes in the audio feed; label each training facial landmark container with a concurrent phoneme detected in the audio feed; isolate groups of consecutive training facial landmark containers labeled with identical phonemes; and store these phoneme-labeled groups of consecutive training facial landmark containers as sequences of phoneme-specific training facial landmark containers. (The application can also: discard remaining training facial landmark containers concurrent with silence or absence of speech in the audio feed; or construct a sequence of non-speech training facial landmark containers with these training facial landmark containers, as described above.) The application can repeat this process over multiple speech intervals by the user within one or over multiple video calls within the user.

The application (or a remote computer system) can then: implement regression, machine learning, artificial intelligence, and/or other methods and techniques to generate and train a speech model that returns a sequence of phoneme-specific facial landmark containers representing distribution of training facial landmarks—such as especially or exclusively mouth position training facial landmarks—of the user when speaking an input phoneme.

When the application detects speech in an audio feed at the user's device while the autopilot mode is active during a later video call, the application can: interpret a current phoneme in the audio feed; query the speech model for a sequence of phoneme-specific facial landmark containers corresponding to this phoneme; stream the sequence of phoneme-specific facial landmark containers to other devices in the video call (e.g., on a loop) until the application detects a next phoneme in the audio feed; and repeat this process for a next detected phoneme.

Upon detecting cessation of speech in the audio feed, the application can return to streaming a sequence of non-speech facial landmark containers to the other devices in the video call.

14.4.1 Whole Facial Landmark Container Based on Emotion+Phoneme

In a similar variation, during a video call, the application can: access a video feed from the user's device; extract training facial landmark containers from video frames in this video feed; access an audio feed from the user's device; implement a speech detection module to detect a string of phonemes in the audio feed; interpret the user's current mood or emotion, such as from the user's audio feed, from the user's video feed, or selected manually by the user; label each training facial landmark container with a concurrent phoneme detected in the audio feed and the user's mood or emotion; isolate groups of consecutive training facial landmark containers labeled with identical phonemes; and store these phoneme- and emotion-labeled groups of consecutive training facial landmark containers as sequences of phoneme- and emotion-specific training facial landmark containers. The application can repeat this process over multiple speech intervals by the user within one video call or over multiple video calls within the user's device.

The application (or the computer system) can then implement regression, machine learning, artificial intelligence, and/or other methods and techniques to generate and train a speech model that returns a sequence of constructed facial landmark containers representing distribution of training facial landmarks of the user when speaking an input phoneme and exhibiting an input emotion.

When the application detects speech in an audio feed at the user's device while the autopilot mode is active during a later video call, the application can: detect and track the user's emotion; interpret a current phoneme in the audio feed; query the speech model for a sequence of phoneme-specific facial landmark containers corresponding to this phoneme and the user's current emotion; stream the sequence of phoneme-specific facial landmark containers to other devices in the video call (e.g., on a loop) until the application detects a next phoneme in the audio feed; and repeat this process for a next phoneme detected.

Upon detecting cessation of speech in the audio feed, the application can return to streaming a sequence of non-speech facial landmark containers to the other devices in the video call.

The application (or the remote computer system) can implement similar methods and techniques to train the speech model to return a sequence of constructed facial landmark containers representing distribution of training facial landmarks of the user when speaking an input phoneme at a particular input speech rate, intensity, volume, and/or tone and/or when exhibiting a particular input emotion. Additionally or alternatively, the application (or the remote computer system) can implement similar methods and techniques to train the speech model to return a sequence of constructed facial landmark containers representing distribution of training facial landmarks of the user when speaking an input sequence of multiple phonemes at a particular input speech rate, intensity, volume, and/or tone and/or when exhibiting a particular input emotion. The application can then execute similar methods and techniques to implement this speech model during a later video call.

For example, the first device can: receive an audio feed from the second device; detect a tone of the second user in the audio feed; and retrieve the prerecorded autopilot sequence of facial landmarks, from a set of prerecorded autopilot sequences of facial landmarks, associated with the tone from the memory.

14.4.2 Partial Facial Landmark Containers: Mouth-Shape Facial Landmark Groups In a similar variation, the application (or the remote computer system) crops training facial landmark containers to include facial landmarks representing the lower half of the user's face, such as the user's mouth, chin, jaw, and lower nose. The application then implements the foregoing methods and techniques to train the speech model to return a sequence of mouth-shape facial landmark groups representing the lower half of the user's face when the user speaks an input phoneme.

Then, when the application detects speech in an audio feed at the user's device while the autopilot mode is active during a video call, the application can: interpret a current phoneme in the audio feed; query the speech model for a sequence of mouth-shape facial landmark groups corresponding to this phoneme; implement methods and techniques described above to map this sequence of mouth-shape facial landmark groups onto facial landmark containers in a sequence of non-speech facial landmark containers—queued for transmission to other devices in the video call—in order to modify these facial landmark containers to represent the mouth shape corresponding to the particular phoneme; stream the resulting constructed facial landmark containers to other devices in the video call.

For example, upon detecting the particular phoneme in the audio feed while the autopilot mode is activated during the video call, the autopilot can: query the speech model for a sequence of mouth-shape facial landmark groups corresponding to this phoneme; select a first facial landmark container in the sequence of non-speech facial landmark containers queued for transmission to other devices on the video call; isolate a subset of mouth-type facial landmarks representing the user's mouth in the first facial landmark container; select a first mouth-shape facial landmark group in the sequence of mouth-shape facial landmark groups corresponding to the particular phoneme; shift the subset of mouth-type facial landmarks—by shortest possible distances—to match the relative positions of corresponding facial landmarks in the first mouth-shape facial landmark group; shift other non-mouth facial landmarks around the subset of mouth-type facial landmarks to maintain relative distances between linked mouth and non-mouth facial landmarks in the first facial landmark container; transmit this first modified facial landmark container to other devices in the video call; and repeat this process for next facial landmark containers—in the sequence of non-speech facial landmark containers and next mouth-shape facial landmark groups—while the application detects this same phoneme in the audio feed.

The application can then: repeat this process for a next phoneme detected in the audio feed; and then return to streaming unmodified non-speech facial landmark containers to the other devices in the video call upon cessation of speech in the audio feed.

Furthermore, in this implementation, the application can: select a stored sequence of non-speech facial landmark containers that correspond to the user's current mood or emotion, such as derived from the user's audio feed or the user's video feed or selected manually by the user; and stream this sequence of non-speech facial landmark containers to other devices in the video call when the autopilot mode is activated at the device. The application can then: modify this sequence of non-speech facial landmark containers according to the detected phonemes in the audio feed and stored sequences of mouth-shape facial landmark groups representing these phonemes; and stream these modified facial landmark containers to other devices in the video call such that these other devices generate and render synthetic face images that depict the user's current emotion and live mouth shape despite absence of the user's face from a live video feed at her device.

15. Tethering+Virtual Camera

One variation of the method S100 includes, during a video call: receiving a selection of a predefined look model of a user; and accessing a first video feed captured by a camera in a first computer. The method also includes, for each frame in a sequence of frames in the first video feed: detecting a constellation of facial landmarks in the frame; representing the constellation of facial landmarks in a facial landmark container and inserting the constellation of facial landmarks and the predefined look model into a synthetic face generator to generate a synthetic face image, in a synthetic video feed, in Block S150. The method S100 further includes, at the computer, serving the synthetic video feed to a video-conferencing application executing on the computer as a virtual camera for streaming to a second device during the video call.

15.1 Applications

Generally, Blocks of the method S100 can be executed by a mobile application executing on a mobile device and/or by a desktop application executing on a computer to: intercept a live video feed captured by a camera in the computer during a video call; detect the face of a user in the live video feed; extract a sequence of constellations of facial landmarks (and facial expression encodings) from frames in this live video feed; inject this sequence of constellations of facial landmarks and a predefined look model selected by the user into a synthetic face generator to generate a synthetic video feed depicting the user according to the look model, but authentically replicating the physiognomy, facial expressions, and movement of the user depicted in the live video feed; and publish this synthetic video feed as a "virtual camera" at the computer.

A video-conferencing application executing on the computer may then access and stream this synthetic video feed—rather than the live video feed—to a second device during a video call such that a second user at the second device experiences an authentic representation of the user's physiognomy, facial expressions, and movement, but with a hair style, makeup style, facial hair, clothing, jewelry, and/or lighting, etc. captured in the look model rather than (necessarily) these characteristics of the user at the time of the video call.

15.1.1 Graphics Processing

Generally, for a mobile device and a computer owned or accessed by a user, the graphics processing unit (or "GPU"), neural processing unit (or "NPU"), or specialized artificial intelligence processing chip (e.g., an ASIC) in the mobile device may be higher-performance than the GPU in the computer. Detection of a face in a video frame, extraction of a constellation of facial landmarks from this video frame, and insertion of this constellation of facial landmarks with a look model into a synthetic face generator to generate a synthetic face image may be relatively computationally intensive. Furthermore, when the user engages in a video call on the computer, she may be relatively unlikely to concurrently engage in graphics-processing-intensive activity at the mobile device.

Therefore, the mobile device (e.g., a mobile application executing on the device) can execute Blocks of the method S100 to receive a live video feed from the computer, detect a face in the live video feed, extract constellations of facial landmarks from this video frame, insert these constellations of facial landmarks with a look model into a synthetic face generator to generate a synthetic video feed, and return this synthetic video feed to the computer. The video-conferencing application at the computer can access this synthetic video feed in real-time during the video call and streams this synthetic video feed to one or more other devices during the video call.

Concurrently, the video-conferencing application can queue a GPU in the computer to render live video frames (or other synthetic video feeds) received from these other devices during the video call.

Thus, the first device and the first computer can cooperate to allocate computational resources (e.g., graphics processing) to concurrently: transform a first live video feed captured by the first computer into a synthetic video feed that can be streamed to a second device in a video call with minimal latency (e.g., less than 10 milliseconds); and render a second live video feed received from the second device with minimal latency.

In particular, the first device and the first computer can cooperate to provide the first user with greater control over how she is depicted for (or shown, presented to) another user in a video call while also integrating with an existing video-conferencing application (e.g., the first user's video-conferencing application of choice) and preserving a video call experience—including limited video latency—within the video-conferencing application.

Furthermore, by executing Blocks of the method S100, the device can generate authentic, photorealistic representations of the first user—such as relative to cartoons, avatars, or caricatures that may lose authenticity and integrity due to compression and simplification of user facial expressions—for transmission to a second user during a video call.

15.1.2 Devices

The method S100 is described herein as executed by a mobile application executing on first mobile device (hereinafter the "device") and a desktop application executing on a first computer in cooperation with a video-conferencing application executing on the first computer.

Furthermore, Blocks of the method S100 are described herein as executed: by the mobile application at the first device to transform a first live video feed received from the first computer to a synthetic video feed based on a look model selected by the user and to return this synthetic video feed to the first computer; and by the desktop application to publish (or "serve") this synthetic video feed in the form of a virtual camera accessible by other applications (e.g., video-conferencing applications) executing on the first computer.

Furthermore, the method S100 is described herein as implemented by consumer devices to generate a photorealistic, synthetic video feed of a user for transmission to other consumer devices during a video call. However, Blocks of the method S100 can be similarly implemented by either or both a mobile device and a computer to generate and send a synthetic video feed to another user during a video call.

Furthermore, the method S100 can be similarly implemented by a mobile device and a computer to host one-way live video distribution or asynchronous video replay.

15.2 Video Call and Virtual Camera

Then, before and/or during the video call, the first device can: access the video feed from the first computer in Block S110; implement a local copy of the facial landmark extractor to detect and extract constellations of facial landmarks from frames in the video feed; compile these constellations of facial landmarks into a feed of facial landmark containers in Block S122; insert this feed of facial landmark containers and a local copy of the selected look model of the first user into a local copy of the synthetic face generator to generate a feed of synthetic face images; render these synthetic face images over a background previously selected by the user to generate a synthetic video feed; and stream this synthetic video feed back to the first computer, such as with a delay of less than 10 milliseconds from the live video feed.

The desktop application executing on the first computer can then publish this synthetic video feed as a "virtual camera" for access by other applications executing on the first computer.

Accordingly, the video-conferencing application can: access this synthetic video feed from the virtual camera; and stream this synthetic video feed—rather than the live video feed—to a second device connected to a video call.

More specifically, before and/or during the video call, the mobile application executing on the first device can: access a live video feed captured by a camera integrated into or connected to the first computer and queue a GPU (or a NPU, specialized AI chip) within the first device to transform this live video feed into a synthetic video feed that depicts the first user: according to a look model selected by the first user but not necessarily how the user appears in the live video frame; and with a physiognomy, facial expression, and position and orientation relative to the camera that is authentic to the live video feed. The first device can then stream this synthetic video feed back to the first computer. The video-conferencing application can then access this synthetic video feed and stream this synthetic video feed—rather than the live video feed—to a second device of a second user on the video call.

Concurrently, the first computer can queue its internal GPU to render a video feed received from the second device during the video call.

15.2.1 Latency

In one variation, the mobile application and/or the desktop application can: characterize latency from capture of a live video frame by the camera to publication of the corresponding synthetic video frame by the desktop application (e.g., for access by the video-conferencing application); and then reallocate graphics processing resources between the first device and the first computer accordingly.

For example, the mobile application can: implement methods and techniques described above to transform a live video frame into a synthetic video frame; extract a timestamp from the live video frame; write this timestamp to the synthetic video frame before returning this synthetic video frame to the first computer; and repeat this process for each subsequent live video frame received from the first computer. The desktop application (and/or the mobile application) can then characterize the latency of this synthetic video feed based on a difference between the current time and the timestamp written to a last synthetic video frame received from the first device.

In one implementation, if the current latency (consistently) exceeds a threshold (e.g., 20 milliseconds), the desktop application and/or the mobile application can prompt the first user to switch from a wireless connection between the first computer and the mobile device to a wired connection in order to reduce latency stemming from wireless transmission of live and synthetic video frames between the first computer and the first device.

In another implementation, if the current latency (consistently) exceeds a threshold (e.g., 20 milliseconds), the mobile application can: switch to accessing a second live video feed from a camera in the first device rather than the live video feed from the first computer; transform this second live video feed into the synthetic video feed; and stream this synthetic video feed to the first computer, thereby eliminating latency from transmission of the live video feed from the first computer to the first device.

In yet another implementation, if this latency exceeds the threshold and if the GPU in the first computer currently has bandwidth to generate synthetic face images locally—such as if video feeds from other devices on the video call are currently muted—the desktop application can: disable synthetic video feed generation at the first device; and, instead, queue transformation of the live video feed into a synthetic video feed locally at the first computer.

Figure 7:
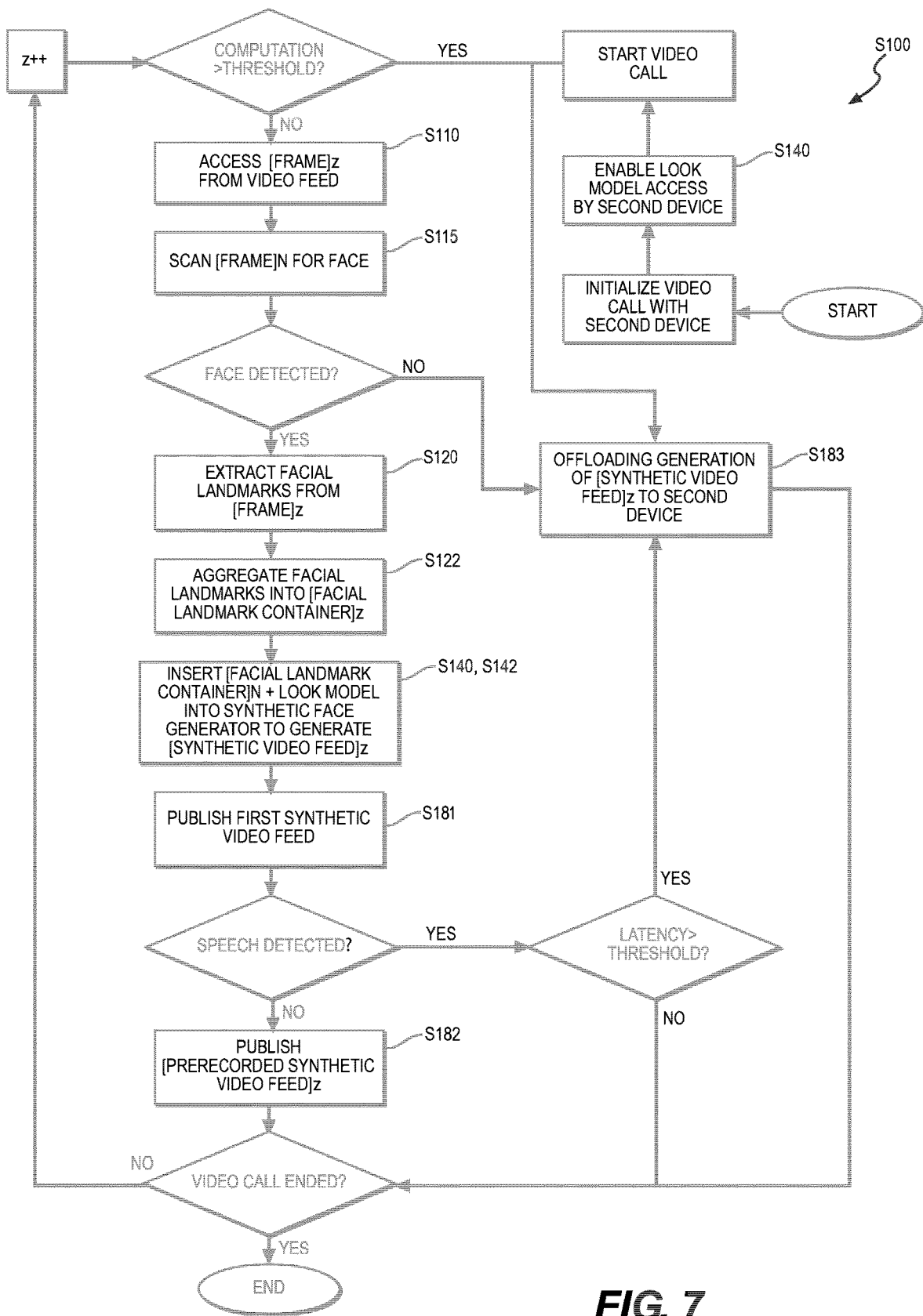
FIG. 7 is a flowchart representation of one variation of the method.

As shown in FIG. 7, another variation of the method S100 includes, during the video call, at the first device: receiving the first sequence of frames in the first live video feed captured by the first camera facing a first user; detecting the face, of the first user, in the first sequence of frames Block S115; generating the first sequence of facial landmark containers representing facial actions of the first user in Block S122; inserting the first sequence of facial landmark containers and the first look model into the synthetic face generator to generate the first synthetic video feed in Block S140, Block S142; publishing the first synthetic video feed for access by the second device during the video call in Block S181; and tracking latency of the first synthetic video feed. Later, during the video call, in response to latency of the first synthetic video feed exceeding a first latency threshold, at the first device: offloading generation of the second synthetic video feed, based on the second sequence of frames captured by the camera during the second time period, to the second device in Block S183.

In one implementation, the first device can: receive the first sequence of frames in the first live video feed captured by the first camera in a first computer communicatively coupled to the first device; and publish the first synthetic video feed as a virtual camera feed for streaming from the first computer to the second device during the video call. Later, during the video call, in response to latency of the first synthetic video feed exceeding a first latency threshold, the first device can offload generation of the second synthetic video feed by: disabling the virtual camera feed; and triggering the first computer to stream the second sequence of frames to the second device.

For example, during the video call, the first device can track latency of the first synthetic video feed. Then, for each frame in the first sequence of frames, the first device can: extract a first timestamp from the frame; store a second timestamp of publication of a corresponding synthetic frame in the first synthetic video feed; and characterize latency of the first synthetic video feed based on a difference between the first timestamp and the second timestamp.

In another implementation, during the video call, in response to latency of a second synthetic video feed falling below a second latency threshold less than the first latency threshold, the first device can implement methods and techniques described above to publish a third synthetic video feed as a third virtual camera for streaming to the second device.

15.2.2 Computational Load

In one variation, the mobile application and/or the desktop application can: track computational load (e.g., CPU usage) of the first device while: extracting facial landmarks from live video frames; and compiling facial landmark containers and the first look model—via the synthetic face generator—into the synthetic video feed. The first device can then implement methods and techniques described above to selectively reallocate extraction of facial landmarks and/or generation of the synthetic video feed to the first computer, to a remote computer system (e.g., a computer network, a remote server), and/or to another device connected to the video call in response to the computational load of the first device exceeding a computational load threshold.

15.2.3 Audio Feed

Furthermore, the video-conferencing application can access a live audio feed directly from a microphone in the first computer and stream this live audio feed to the second device during the video call.

In another implementation, the desktop application can: access the live audio feed from the microphone in the first computer; implement methods and techniques described above to characterize the latency of the synthetic video feed, such as in real-time after receipt of each subsequent synthetic face image from the mobile device; and publish this audio feed—delayed according to the real-time latency of the synthetic video feed—to a virtual microphone. The video-conferencing application can then access this audio feed from the virtual microphone and stream this audio feed to the second device in the video call, thereby maintaining temporal alignment between the audio feed and the synthetic video feed throughout the video call.

15.2 Synthetic Body Image

Figure 2D:
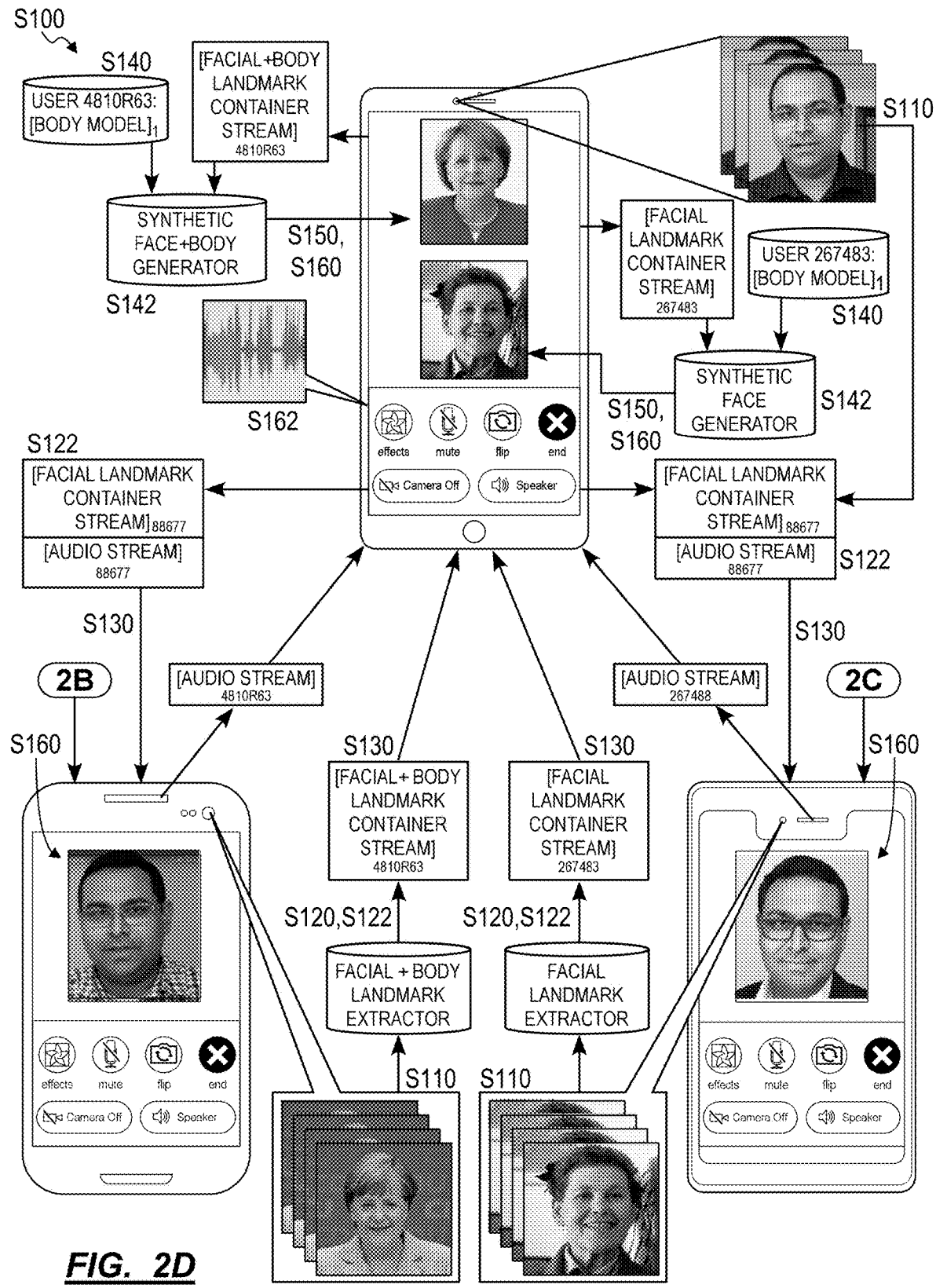

As shown in FIGS. 2C and 2D, and as described in U.S. patent application Ser. No. 16/870,010, the mobile application can implement similar methods and techniques to generate a body model for the user, such as before or during a video call. Then, during a video call, the desktop application can access a frame captured by the camera in the computer and route the frame to the mobile application. The mobile application can then implement methods and techniques described above to: extract both a facial landmark container and a body landmark container from the image; inject the facial landmark container and a look model selected by the user into the synthetic face generator to generate a synthetic face image of the user; inject the body landmark container and a body model selected by the user into a synthetic body generator to generate a synthetic body image of the user; assemble the synthetic face image and the synthetic body image over a background selected by the user to generate a synthetic video frame; and return this synthetic video frame to the desktop application. The desktop application can then publish this synthetic video frame to a virtual camera feed, and the video-conferencing application can access this virtual camera feed and transmit this synthetic video frame to a second device. The desktop application, the mobile application, and the video-conferencing application can repeat this process for each subsequent frame captured by the camera throughout the video call.

For example, during the video call, the first device can: receive a third sequence of frames in a third video feed captured by the first camera facing the first user; detect the face and a body, of the first user, in the third sequence of frames; generate a third sequence of facial landmark containers representing facial actions of the first user detected in the third sequence of frames; generate a first sequence of body landmark containers representing corporeal characteristics of the first user detected in the third sequence of frames; insert the third sequence of facial landmark containers and the first look model into the synthetic face generator to generate a first sequence of synthetic face images; transform the first sequence of body landmark containers and a first body model into a first sequence of synthetic body images, according to a synthetic body generator; combine the first sequence of synthetic face images and the first sequence of synthetic body images to generate a third synthetic video feed; and publish the third synthetic video feed as a virtual camera for streaming to the second device.

16. Image Processing Redistribution Between Devices

As shown in FIG. 7, another variation of the method S100 includes, during the video call, the first device can: track a computational load of the first device; and receive the first sequence of frames in the first video feed captured by the first camera facing the first user. Then, in response to the computational load of the first device falling below a first computational load threshold, the first device can then implement the method and techniques described above to: detect the face, of the first user, in the first sequence of frames in Block S115; extract facial landmarks of the face of the first user in Block S120; generate a first sequence of facial landmark containers representing facial actions of the first user in Block S122; insert the first sequence of facial landmark containers and the first look model into the synthetic face generator to generate the first synthetic video feed in Block S140, S142; and publish the first synthetic video feed for access by the second device during the video call in Block S181. Later in the video call, the first device can track the computational load of the first device and, in response to the computational load of the first device exceeding the first computational load threshold, the first device can offload generation of a second synthetic video feed, based on a second sequence of frames captured by the camera during the second time period, to the second device in Block S183.

Therefore, the first device is triggered by the computational load, in relation to a computational load threshold, to generate the image processing of the synthetic video feed or redistribute the imaging processing of the synthetic video feed to another device on the video call.

16.1 Applications

In this variation, a first device executing the method—such as a smartphone or laptop computer—during a video call can: access live video feed from a camera integrated into or connected to the first device; extract facial landmarks from frames in the live video feed; compile these facial landmarks and a first look model of a first user—via the synthetic face generator—into a first synthetic video feed; returns the first synthetic video feed to other devices connected to the video call (e.g., by transmitting the first synthetic video feed to these other devices or by publishing the first synthetic video feed as a virtual camera accessible by a tethered computing device as described above); and track computational load (e.g., CPU usage) of the first device during these operations. Furthermore, in response to the computational load of the first device exceeding a threshold computing device (e.g., 50% CPU usage from image processing, 90% total CPU usage), the first device can reallocate facial landmark extraction and/or synthetic video feed generation processes to a tethered computing device, a remote computer system (e.g., a computer network, a remote server), and/or another device connected to the video call.

For example, temperature, computational latency, risk of processor damage, etc. of the first device may be proportional to computational load. Therefore, the first device can track computational load and implement a computational load threshold to trigger selective reallocation of computational tasks to other devices during the video call, thereby: maintaining temperature of the first device within a target operating range; limiting latency; and limiting processor risk.

16.1.1 Local Facial Landmark Extraction+Synthetic Video Feed Generation by Second Device In one variation, during the video call, the first device can locally extract facial landmarks from the camera in the first device and reallocate generation of the synthetic video feed to the second device. Then, the second device can generate the synthetic video feed and publish the synthetic video feed for access by the first device to stream to the second device on the video call.

In one implementation, during the video call, the first device can receive the first sequence of frames in the first live video feed captured by a camera in a first computer tethered to the first device. Then, the first device can implement the method and techniques described above to locally generate a first synthetic video feed and publish the first synthetic video feed as a virtual camera feed for streaming from the first computer to the second device during the video call. Later in the video call, the first device can: receive the second sequence of frames in the first video feed captured by the first camera in the first computer; detect the face, of the first user, in the second sequence of frames; and generate a second sequence of facial landmark containers representing facial actions of the first user. The first device can then offload the generation of the second synthetic video feed to the second device by disabling the virtual camera feed at the first device and streaming the second sequence of facial landmark containers to the second device.

16.1.2 Local Facial Landmark Extraction+Synthetic Video Feed Generation by Server In another implementation, during the video call, the first device can locally extract facial landmarks from the camera in the first device and reallocate generation of the synthetic video feed to a server. Then, the server can generate the synthetic video feed and publish the synthetic video feed for access by the first device to stream to other devices on the video call.

For example, later in the video call, the first device can: track the computational load of the first device and, in response to the computational load of the first device exceeding the first computational load threshold, offload the generation of a third synthetic video feed, based on a third sequence of frames captured by the first camera in the first device to a remote server. Accordingly, the remote server can: access the third sequence of frames from the first device; detect the face, of the first user, in the third sequence of frames; generate a third sequence of facial landmark containers representing facial actions of the first user; insert the third sequence of facial landmark containers and the first look model into the synthetic face generator to generate a third synthetic video feed; and transmit the third synthetic video feed to the second device on the video call.

16.2 Autopilot Option

A variation includes accessing an audio feed captured by the first microphone in the first device; scanning for human speech; tracking the computational load of the first device; entering an autopilot mode; and publishing a prerecorded synthetic video feed when there is absence of speech in the audio feed.

In one implementation, after the first device publishes the first synthetic video feed, the first device can: access an audio feed captured by the first microphone in the first device; scan the audio feed for human speech; and offload generation of the synthetic video feed to the second device when the computational load exceeds the first computational load threshold and human speech is detected in the audio feed. Later, in the video call, the first device can again scan the audio feed for human speech. Then, responsive to the computational load of the first device exceeding the first computational load threshold and responsive to detecting absence of speech in the audio feed, the first device can publish the prerecorded synthetic video feed for access by the second device.

In this implementation, in order for the first device to publish the prerecorded synthetic video feed for access by the second device, the first device can: retrieve a prerecorded autopilot sequence of facial landmark containers from a memory in the first device; and insert the prerecorded autopilot sequence of facial landmark containers and the first look model into a synthetic face generator to generate a prerecorded synthetic video feed depicting predefined facial actions, represented in the prerecorded autopilot sequence of facial landmark containers, according to the first look model.

For example, in this variation, the first device can offload generation of the synthetic video feed to the second device if presence of speech by the first user is detected and the computational load exceeds the first computational load threshold. Then, the first device can implement methods and techniques described above to activate an autopilot mode to render the prerecorded synthetic video feed if absence of speech by the first user is detected in the audio feed from the first device, and the computational load of the first device exceeds the first computational load threshold.

In this example, the first device can track the temperature of a first processor in the first device and can calculate the computational load threshold inversely proportional to the temperature of the first processor as another implementation to triggering offloading of a synthetic video feed.

Alternatively, the first device can activate the speech-type autopilot when triggered by the computational load of the first device exceeding the first computational load threshold. The first device can also activate the non-speech type autopilot when triggered by the computational load of the fist device exceeding the first computational load threshold and by detecting absence of speech in the audio feed from the first device.

16.3 Inbound Image Processing Request

In one variation, the first device tracks the computational load of the first device and compares the computational load to a second computational load threshold to determine if the first device can accept inbound requests to generate a synthetic video feed to stream as a virtual camera to the other devices on the video call.

In one implementation, during the video call, the first device can: track the computational load of the first device; and receive a third sequence of frames in the third video feed captured by the camera in the first device. Then, in response to the computational load of the first device falling below a second computational load threshold less than the first computational load threshold, the first device can: detect the face, of the first user, in the third sequence of frames; generate a third sequence of facial landmark containers representing facial actions of the first user; insert the third sequence of facial landmark containers and the first look model into the synthetic face generator to generate a third synthetic video feed; and publish the third synthetic video feed as a third virtual camera for streaming to the second device, during the video call.

In particular, other devices during the video call may exhibit elevated computational loads. Concurrently, the first device may exhibit low computational load. Accordingly, the first device can broadcast excess computational resources to other devices on the video call and enable these other devices to reallocate facial landmark container extraction and/or synthetic video feed generation processes to the first device.

More specifically, other devices on the video call can execute methods and techniques described above to detect high computational load and transmit facial landmark containers and/or live video feed to the first device for transformation into a synthetic video feed depicting other users at the other devices.

For example, the first device can: publish the first synthetic video feed, associated with the first device, and the second synthetic video feed, associated with the second device, for access by the second device during the video call; and publish the first synthetic video feed and the third synthetic video feed, associated with the third device, for access by the third device during the video call.

Alternatively, the first device can: publish the first synthetic video feed for access by the second device during the video call; publish the first synthetic video feed and the third synthetic video feed for access by the third device during the video call; and publish the first synthetic video feed and the fourth synthetic video feed for access by a fourth device during the video call.

16.3.1 Outbound Image Processing Request

In this variation, the first device tracks the computational load of the first device and compares the computational load to the first computational load threshold to determine if the first device can accept outbound requests for generating a synthetic feed from another device on the video call. If the computational load falls below the first computational load threshold, the first device can generate a synthetic video feed to stream as a virtual camera to another device. Alternatively, if the computational load exceeds the first computational load threshold, the first device can selectively reallocate facial landmark extraction and/or synthetic video feed generation to a remote computer.

For example, during the video call, the first device can receive a third sequence of facial landmark containers from the second device. Then, in response to the computational load of the first device falling below the first computational load threshold, the first device can: insert the third sequence of facial landmark containers and a second look model, associated with a second user at the second device, into the synthetic face generator to generate a third synthetic video feed; and render the third synthetic video feed. Even later in the video call, responsive to the computational load of the first device exceeding the first computational load threshold, the first device can: offload generation of a fourth synthetic video feed, based on a fourth sequence of frames captured by the second camera in the second device during the fourth time period, to a remote computer; access the fourth synthetic video feed from the remote computer; and render the fourth synthetic video feed.

16.4 Manual Selection Option

In another variation, the fist user manually enables generation of the synthetic video feed depicting a second user at the second device and implements methods and techniques described above to render the synthetic video feed for access by the second device.

In one implementation, the first device can receive a manual selection by the first user to enable generation of the second synthetic video feed representing the second user at the second device. Then, during the video call, based on the manual selection and in response to the computational load of the first device falling below the first computational load threshold, the first device can: receive a third sequence of facial landmark containers from the second device; insert the third sequence of facial landmark containers and a second look model, associated with the second user, into the synthetic face generator to generate a third synthetic video feed; and render the third synthetic video feed.

Therefore, the first user can selectively reallocate the extraction of facial landmarks and/or generation of the synthetic video feed representing other users at other devices on the video call.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for enabling autopilot video functions during a video call comprising:

during a first time period at a first device:
  receiving a first sequence of frames captured by an optical sensor in the first device;
  detecting a face, of a first user, in the first sequence of frames;
  generating a first sequence of facial landmark containers representing facial actions of the face of the first user detected in the first sequence of frames;
  accessing an audio feed captured by a microphone in the first device:
  detecting absence of speech in the audio feed during a first time interval;
  selecting a subset of facial landmark containers, in the first sequence of facial landmark containers, corresponding to the first time interval:
  storing the subset of facial landmark containers as a prerecorded autopilot sequence of facial landmark containers in memory; and
  transmitting the first sequence of facial landmark containers to a second device for combination with a first look model, associated with the first user, to generate a first synthetic image feed depicting facial actions of the first user during the first time period, represented in the first sequence of facial landmark containers, according to the first look model;

detecting a trigger event; and during a second time period at the first device, in response to detecting a first trigger event:
  entering an autopilot mode;
  retrieving the prerecorded autopilot sequence of facial landmark containers from memory; and
  transmitting the prerecorded autopilot sequence of facial landmark containers to a second device for combination with the first look model to generate a second synthetic image feed depicting predefined facial actions, represented in the prerecorded autopilot sequence of facial landmark containers, according to the first look model.

2. The method of claim 1:

further comprising, during a setup period prior to the first time period:
  accessing a target image of the first user;
  detecting a target face in the target image;
  representing a target constellation of facial landmarks, detected in the target image, in a target facial landmark container;
  initializing a target set of look model coefficients;
  generating a synthetic test image based on the target facial landmark container, the target set of look model coefficients, and a synthetic face generator;
  characterizing a difference between the synthetic test image and the target face detected in the target image;
  adjusting the target set of look model coefficients to reduce the difference; and
  generating a first look model, associated with the first user, based on the target set of look model coefficients; and further comprising, at the second device, accessing the first look model prior to the first time period.

3. The method of claim 1, further comprising, at the second device:

prior to the first time period, accessing the first look model in preparation for a video call involving the first device;

during the first time period:
  receiving the first sequence of facial landmark containers from the first device; and
  transforming the first sequence of facial landmark containers and the first face model into a first sequence of synthetic face images based on the synthetic face generator;

during the second time period:
  receiving the prerecorded autopilot sequence of facial landmark containers from the first device; and
  transforming the prerecorded autopilot sequence of facial landmark containers and the first face model into a second sequence of synthetic face images based on the synthetic face generator; and rendering the first sequence of synthetic face images immediately followed by rendering the second sequence of synthetic face images during the video call.

4. The method of claim 1:

further comprising, at the first device, in response to entering the autopilot mode at the first device, broadcasting an autopilot flag to the second device; and further comprising, at the second device:
  receiving the autopilot flag from the first device; and
  in response to receiving the autopilot flag from the first device, rendering a visual icon adjacent the second sequence of synthetic face images, the visual icon indicating activation of the autopilot mode at the first device.

5. The method of claim 1:
wherein detecting the face of the first user in the first sequence of frames and generating the first sequence of facial landmark containers comprises, for a first frame, in the first sequence of frames:
scanning the first frame for the face of the first user; and
in response to detecting the face in a region of the first frame:
extracting a first set of facial landmarks representing facial actions of the face of the first user from the region of the first frame; and
storing the first set of facial landmarks in a first facial landmark container, in the first sequence of facial landmark containers; and
wherein detecting the trigger event comprises, for a last frame, in the first sequence of frames:
scanning the last frame for the face of the first user; and
detecting the trigger event based on absence of the face in the last frame.

6. The method of claim 5, further comprising:
during the second time period at the first device, scanning each frame, in the second sequence of frames, for the face of the first user;
in response to detecting the first face of the first user in a last frame in the second sequence of frames exiting the autopilot mode; and
during a third time period, in response to exiting the autopilot mode:
receiving a third sequence of frames captured by an optical sensor in the first device;
detecting the face, of the first user, in the third sequence of frames;
generating a third sequence of facial landmark containers representing facial actions of the face of the first user detected in the third sequence of frames; and
transmitting the third sequence of facial landmark containers to the second device for combination with the first look model to generate a third synthetic image feed depicting facial actions of the first user during the third time period, represented in the third sequence of facial landmark containers, according to the first look model.

7. The method of claim 1:
wherein detecting the trigger comprises detecting deactivation of a video feed, captured by the optical sensor in the first device, at a first time between the first time period and the second time period; and
further comprising, at the first device:
detecting activation of the video feed at a second time succeeding the first time;
in response to detecting activation of the video feed, exiting the autopilot mode; and
during a third time period, in response to exiting the autopilot mode:
receiving a third sequence of frames captured by an optical sensor in the first device;
detecting the face, of the first user, in the third sequence of frames;
generating a third sequence of facial landmark containers representing facial actions of the face of the first user detected in the third sequence of frames; and
transmitting the third sequence of facial landmark containers to the second device for combination with the first look model to generate a third synthetic image feed depicting facial actions of the first user during the third time period, represented in the third sequence of facial landmark containers, according to the first look model.

8. The method of claim 1:
further comprising, during the first time period, tracking a computational load of the first device;
wherein detecting the trigger event comprises, detecting the computational load of the first device exceeding a first computational load threshold;
further comprising, during the second time period, tracking the computational load of the first device; and
further comprising, in response to the computational load of the first device falling below a second computational load threshold less than the first computational load threshold:
exiting the autopilot mode; and
during a third time period, in response to exiting the autopilot mode:
receiving a third sequence of frames captured by an optical sensor in the first device;
detecting the face, of the first user, in the third sequence of frames;
generating a third sequence of facial landmark containers representing facial actions of the face of the first user detected in the third sequence of frames; and
transmitting the third sequence of facial landmark containers to the second device for combination with the first look model to generate a third synthetic image feed depicting facial actions of the first user during the third time period, represented in the third sequence of facial landmark containers, according to the first look model.

9. The method of claim 1:
further comprising, at the first device:
receiving an audio feed from the second device; and
detecting a tone of the second user in the audio feed; and
wherein retrieving the prerecorded autopilot sequence of facial landmark containers from the memory comprises retrieving the prerecorded autopilot sequence of facial landmarks, from a set of prerecorded autopilot sequence of facial landmarks, associated with the tone.

10. The method of claim 1:
further comprising, during a waiting period prior to the first period:
accessing an initial set of frames captured by the optical sensor at the first device;
generating an initial sequence of facial landmark containers representing facial actions of the face of the first user detected in the initial set of frames; and
storing the initial sequence of facial landmark containers as the prerecorded autopilot sequence of facial landmark containers in the memory for the video call; and
in response to a conclusion of the video call, discarding the prerecorded autopilot sequence of facial landmark containers from the memory.

11. The method of claim 1:
further comprising, at the first device, interpreting a first emotion of the first user during the first time period based on facial features of the first user detected in the first sequence of frames; and wherein retrieving the prerecorded autopilot sequence of facial landmark containers from the memory comprises:
    accessing a set of prerecorded autopilot sequences of facial landmark containers representing the first user exhibiting a set of discrete emotions; and
    retrieving the prerecorded autopilot sequence of facial landmark containers, from the set of prerecorded autopilot sequences of facial landmarks containers, associated with the first emotion.

12. A method for enabling autopilot video functions during a video call comprising:
    during a first time period at a first device:
        receiving a first sequence of frames captured by an optical sensor in the first device;
        detecting a face, of the first user, in the first sequence of frames;
        generating a first sequence of facial landmark containers representing facial actions of the face of the first user detected in the first sequence of frames; and
        transmitting the first sequence of facial landmark containers to a second device for combination with a first look model, associated with the first user, to generate a first synthetic image feed depicting facial actions of the first user during the first time period, represented in the first sequence of facial landmark containers, according to the first look model;
    detecting a trigger event; and
    during a second time period at the first device, in response to detecting a first trigger event:
        entering an autopilot mode;
        receiving a first inbound set of facial landmark containers, from a set of devices, representing faces of users of the set of devices at a first time;
        calculating a first combination of the first inbound set of facial landmark containers;
        constructing an autopilot sequence of facial landmark containers based on content excluded from frames captured by the optical sensor during the second time period;
        storing the first combination of the first inbound set of facial landmark containers as a first autopilot facial landmark container in the autopilot sequence of facial landmark containers; and
        transmitting the autopilot sequence of facial landmark containers to a second device for combination with the first look model to generate a second synthetic image feed depicting predefined facial actions, represented in the autopilot sequence of facial landmark containers, according to the first look model.

13. A method for enabling autopilot video functions during a video call comprising:
    during a first time period at a first device:
        receiving a first sequence of frames captured by an optical sensor in the first device;
        detecting a face, of a first user, in the first sequence of frames;
        generating a first sequence of facial landmark containers representing facial actions of the face of the first user detected in the first sequence of frames; and
        transmitting the first sequence of facial landmark containers to a set of devices, comprising a second device, for combination with local copies of the first look model to generate synthetic image feeds depicting facial actions of the first user during the first time period;
    detecting a first trigger event; and
    during a second time period at the first device, in response to detecting the first trigger event:
        entering an autopilot mode;
        receiving an audio feed from the second device in the set of devices;
        extracting a first sequence of phonemes of a second user in the audio feed;
        retrieving a prerecorded autopilot sequence of speech-type facial landmark containers from a set of prerecorded autopilot sequences of speech-type facial landmark containers, associated with the first sequence of phonemes of the second user; and
        transmitting the prerecorded autopilot sequence of speech-type facial landmark containers to the set of devices, comprising the second device, for combination with local copies of the first look model to generate synthetic image feeds.

14. The method of claim 13:
    further comprising, at the first device, in response to entering the autopilot mode at the first device, broadcasting an autopilot flag to the set of devices; and
    further comprising, at the set of devices:
        receiving the autopilot flag from the first device; and
        in response to receiving the autopilot flag from the first device, rendering a visual icon adjacent the synthetic image feed at each device, the visual icon indicating activation of the autopilot mode at the first device.

15. A method for enabling autopilot video functions during a video call comprising:
    during a first time period at a first device:
        receiving a first sequence of frames captured by an optical sensor in the first device;
        detecting a face, of a first user, in the first sequence of frames;
        at the first device, interpreting a first emotion of the first user during the first time period based on facial features of the first user detected in the first sequence of frames;
        generating a first sequence of facial landmark containers representing facial actions of the face of the first user detected in the first sequence of frames; and
        transmitting the first sequence of facial landmark containers to a second device for combination with a first look model, associated with the first user, to generate a first synthetic image feed depicting facial actions of the first user during the first time period, represented in the first sequence of facial landmark containers, according to the first look model;
    detecting a trigger event; and
    during a second time period at the first device, in response to detecting a first trigger event:
        entering an autopilot mode;
        accessing a set of prerecorded autopilot sequences of facial landmark containers representing the first user exhibiting a set of discrete emotions;
        retrieving a prerecorded autopilot sequence of facial landmark containers, from the set of prerecorded autopilot sequence of facial landmark containers, associated with the first emotion; and
        transmitting the prerecorded autopilot sequence of facial landmark containers to a second device for combination with the first look model to generate a second synthetic image feed depicting predefined facial actions, represented in the prerecorded autopilot sequence of facial landmark containers, according to the first look model.

16. The method of claim 15:
wherein generating a first sequence of facial landmark containers comprises:
   initializing a first facial landmark container, the first sequence of facial landmark containers, for a target frame in the first sequence of frames; and
   for each action unit, in a predefined set of action units representing action of human facial muscles:
      detecting a facial region of the first user, depicted in the target frame, containing a muscle associated with the action unit;
      interpreting an intensity of action of the muscle based on a set of features extracted from the facial region depicted in the first sequence of frames; and
      representing the intensity of action of the muscle in the first facial landmark container; and
wherein retrieving the prerecorded autopilot sequence of facial landmark containers from the memory comprises retrieving a first prerecorded autopilot facial landmark container representing intensities of actions of muscles, associated with the predefined set of action units, corresponding to the first emotion.

17. A method for enabling autopilot video functions during a video call comprising:
during a first time period at a first device:
   receiving a first sequence of frames captured by an optical sensor in a first device;
   detecting a face, of a first user, in the first sequence of frames;
   generating a first sequence of facial landmark containers representing facial actions of the face of the first user detected in the first sequence of frames; and
   transmitting the first sequence of facial landmark containers to a second device for combination with a first look model, associated with the first user, to generate a first synthetic image feed depicting facial actions of the first user during the first time period, represented in the first sequence of facial landmark containers, according to the first look model;
detecting a trigger event; and
during a second time period at the first device, in response to detecting a first trigger event:
   entering an autopilot mode;
   accessing an audio feed captured by a microphone in the first device; and
   in response to detecting presence of speech, extracting a first sequence of phonemes from the audio feed during a first time interval;
   accessing a set of prerecorded autopilot sequences of speech-type facial landmark containers representing vocal signals of the first user;
   retrieving a prerecorded autopilot sequence of speech-type facial landmark containers, from the set of prerecorded autopilot sequences of speech-type facial landmarks containers, associated with the first sequence of phonemes; and
   transmitting the prerecorded autopilot sequence of speech-type facial landmark containers to a second device for combination with the first look model to generate a second synthetic image feed.

* * * * *